US008588092B2

(12) United States Patent
Oshima

(10) Patent No.: US 8,588,092 B2
(45) Date of Patent: Nov. 19, 2013

(54) TRANSMISSION RATE SETTING DEVICE, TRANSMISSION RATE SETTING DEVICE CONTROL METHOD, CONTENT-FILTERING SYSTEM, TRANSMISSION RATE SETTING DEVICE CONTROL PROGRAM, AND COMPUTER-READABLE RECORDING MEDIUM

(75) Inventor: Toshiharu Oshima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 512 days.

(21) Appl. No.: 12/991,376

(22) PCT Filed: Apr. 19, 2010

(86) PCT No.: PCT/JP2010/056949
§ 371 (c)(1),
(2), (4) Date: Nov. 5, 2010

(87) PCT Pub. No.: WO2010/122986
PCT Pub. Date: Oct. 28, 2010

(65) Prior Publication Data
US 2011/0058575 A1  Mar. 10, 2011

(30) Foreign Application Priority Data

Apr. 20, 2009 (JP) ................................ 2009-102047

(51) Int. Cl.
*H04J 3/14* (2006.01)
*H04L 12/26* (2006.01)

(52) U.S. Cl.
USPC ............ 370/252; 370/468; 709/228; 709/233

(58) Field of Classification Search
None
See application file for complete search history.

(56) References Cited

U.S. PATENT DOCUMENTS

| 7,130,271 | B1 | 10/2006 | Sekihata |
| 7,647,411 | B1* | 1/2010 | Schiavone et al. ............ 709/229 |
| 2003/0084184 | A1 | 5/2003 | Eggleston et al. |
| 2006/0026296 | A1* | 2/2006 | Nagaraj ........................ 709/233 |
| 2006/0171350 | A1 | 8/2006 | Taniguchi et al. |
| 2011/0197237 | A1* | 8/2011 | Turner ............................ 725/78 |

FOREIGN PATENT DOCUMENTS

| CN | 1163529 A | 10/1997 |
| CN | 1816215 A | 8/2006 |

(Continued)

OTHER PUBLICATIONS

European Search report for corresponding European patent application No. 10767043.2, dated Jun. 1, 2012.

*Primary Examiner* — Min Jung
(74) *Attorney, Agent, or Firm* — Birch, Stewart, Kolasch & Birch, LLP

(57) ABSTRACT

To reduce wasteful consumption of electric power for a data communication without providing a complex mechanism, a communication connection device (100) for setting a transmission rate for a communication between a communication terminal (T1) and a web server (W1) includes: a transmission rate control section (122) for detecting that a restriction has been placed on the communication from the communication terminal (T1) to the web server (W1); and a transmission rate setting section (123) for setting, if the transmission rate control section (122) has detected that a restriction has been placed on the communication, a transmission rate for the communication, carried out by the communication terminal (T1), so that the transmission rate becomes lower than before the restriction has been placed on the communication.

15 Claims, 15 Drawing Sheets

(56) References Cited

FOREIGN PATENT DOCUMENTS

| EP | 1 244 265 A2 | 9/2002 |
| EP | 16818515 A1 | 7/2006 |
| JP | 2000-270002 A | 9/2000 |
| JP | 2002-223228 A | 8/2002 |
| JP | 2003-85079 A | 3/2003 |
| JP | 2004-32525 A | 1/2004 |
| JP | 2006-209568 A | 8/2006 |
| JP | 2006-246087 A | 9/2006 |
| WO | WO 01/26300 A1 | 4/2001 |
| WO | WO 03/001719 A2 | 1/2003 |
| WO | WO 03/049403 A2 | 6/2003 |

\* cited by examiner

FIG. 3

| PORT IDENTIFICATION NUMBER | TERMINAL IDENTIFICATION INFORMATION |
|---|---|
| 1 | xx:xx:xx:xx:xx:01 |
| 2 | xx:xx:xx:xx:xx:02 |
| ⋮ | ⋮ |
| n | xx:xx:xx:xx:xx:0n |

FIG. 5

| RESTRICTION TARGET COMMUNICATION DESTINATION INFORMATION | TERMINAL IDENTIFICATION INFORMATION | RATE RESTRICTION INFORMATION |
|---|---|---|
| xxx.XXX.com | xx:xx:xx:xx:xx:0n | NON-TARGET |
| yyy.YYY.co.jp | ALL | NON-TARGET |
| zzz.ZZZ.tv | xx:xx:xx:xx:xx:01 | TARGET |
| ⋮ | ⋮ | ⋮ |
| nnn.NNN.jp | xx:xx:xx:xx:xx:02 | NON-TARGET |

FIG. 8

| PORT IDENTIFICATION NUMBER | PORT RESTRICTION PERIOD |
|---|---|
| 1 | 1800 SECONDS |
| 2 | NA |
| ⋮ | ⋮ |
| n | NA |

FIG. 10

(a) INITIAL STATE

| PORT IDENTIFICATION NUMBER | RESTRICTED TERMINAL IDENTIFICATION INFORMATION |
|---|---|
| 1 | 192.168.1.A |
| 2 | 192.168.1.B |
| ... | ... |
| n | NA |

(b) FIRST TIME

| PORT IDENTIFICATION NUMBER | RESTRICTED TERMINAL IDENTIFICATION INFORMATION |
|---|---|
| 1 | 192.168.1.A |
| 2 | NA |
| ... | ... |
| n | NA |

(c) SECOND TIME

| PORT IDENTIFICATION NUMBER | RESTRICTED TERMINAL IDENTIFICATION INFORMATION |
|---|---|
| 1 | NA |
| 2 | NA |
| ... | ... |
| n | NA |

FIG. 12

(a) INITIAL STATE

| PORT IDENTIFICATION NUMBER | RESTRICTED TERMINAL IDENTIFICATION INFORMATION |
|---|---|
| 1 | xx:xx:xx:xx:xx:01 |
| 2 | xx:xx:xx:xx:xx:02 |
| ... | ... |
| n | NA |

(b) FIRST TIME

| PORT IDENTIFICATION NUMBER | RESTRICTED TERMINAL IDENTIFICATION INFORMATION |
|---|---|
| 1 | xx:xx:xx:xx:xx:01 |
| 2 | NA |
| ... | ... |
| n | NA |

(c) SECOND TIME

| PORT IDENTIFICATION NUMBER | RESTRICTED TERMINAL IDENTIFICATION INFORMATION |
|---|---|
| 1 | NA |
| 2 | NA |
| ... | ... |
| n | NA |

TRANSMISSION RATE SETTING DEVICE, TRANSMISSION RATE SETTING DEVICE CONTROL METHOD, CONTENT-FILTERING SYSTEM, TRANSMISSION RATE SETTING DEVICE CONTROL PROGRAM, AND COMPUTER-READABLE RECORDING MEDIUM

TECHNICAL FIELD

The present invention relates to a transmission rate setting device, a transmission rate setting device control method, a content-filtering system, a transmission rate setting device control program, and a computer-readable recording medium, each of which sets a transmission rate for a network connection between a communication terminal and its communication destination.

BACKGROUND ART

A network device having a so-called content-filtering function has conventionally been developed, in which network device it is possible to restrict access, of a communication terminal connected to a LAN (local area network), to a particular server or content on an external network such as the Internet (see, for example, Patent Literature 1).

The following description deals with an example arrangement of a conventional content-filtering system with reference to FIG. 15. FIG. 15 is a functional block diagram schematically illustrating an arrangement of a conventional content-filtering system 20.

As illustrated in FIG. 15, a content-filtering device 500 is provided between a communication connection device 400 and the Internet 300. Communication terminals T1 through Tn are connected to ports P1 through Pn of the communication connection device 400, respectively.

A request to be transmitted from any of the communication terminals T1 through Tn to a web server (not shown) on the Internet 300 is first transmitted, via a communication connection section 410 of the communication connection device 400, from a LAN interface 430 to the content-filtering device 500.

In the content-filtering device 500, the request is received at a LAN interface 530, and a content-filtering performing section 520 performs verification for the request by referring to a content filter DB 510. If the request is verified, the request is transmitted from a WAN interface 540 to the Internet 300.

Examples of the filtering function encompass: a filtering function which restricts access to a particular domain or URI (uniform resource identifier); a filtering function which restricts access in accordance with what kind of content is to be accessed and/or what is contained in the content; and a filtering function which, for example, modifies the content itself so that it is appropriate (see, for example, Patent Literature 2). Examples of the network device encompass a router, a proxy server, etc.

A network device having the above filtering function has been introduced in, e.g., an in-house network of a company so as to, for example, (i) prohibit or restrict viewing of content unnecessary for work and/or (ii) prevent a network band from being congested due to careless access to content. Since access to large-volume content such as moving image data and audio data tends to occupy a large portion of the network band, access to such content is in particular restricted in some companies.

As another technique related to the network device, a switching hub has been developed which can switch its transmission rate stepwise by switching its operation modes. The operation modes are settings as to a transmission rate and a transmission mode. The transmission rate is set stepwise. Examples of the transmission mode encompass a full-duplex transmission, a half-duplex transmission, etc.

The switching hub may have an auto-negotiation function, by which an adjustment is made so that the switching hub can operate normally at the highest transmission rate if possible or in a high-priority operation mode.

Further, a proposal has been made in which ports of a switching hub are monitored so that the changing an operation mode to an operation mode having a lower transmission rate for the ports being monitored is carried out such that a port having the lowest line utilization is preferentially changed (see, for example, Patent Literature 3).

Patent Literature 3, for example, discloses a technique in which a transmission rate is changed by switching from an operation mode having a 100-Mbps (megabits per second) full-duplex transmission to an operation mode having a 10-Mbps full-duplex transmission.

As described above, a switching hub may be capable of switching between (i) an operation mode having a high transmission rate which is sufficient to transmit or receive large-volume content data and (ii) an operation mode having a low transmission rate which is sufficient to transmit or receive small-volume content data (e.g., text-based data such as email).

CITATION LIST

Patent Literature 1

Japanese Patent Application Publication, Tokukai, No. 2003-85079 A (Publication Date: Mar. 20, 2003)

Patent Literature 2

Japanese Patent Application Publication, Tokukai, No. 2006-209568 A (Publication Date: Aug. 10, 2006)

Patent Literature 3

International Publication No. 01/26300 (A1), specification (Publication Date: Apr. 12, 2001)

SUMMARY OF INVENTION

Technical Problem

According to the above conventional art, however, a communication terminal connected to a LAN switch operates in its operation modes unaffectedly even in the case where access is restricted due to a filtering function.

Thus, even in a case where, for example, access by a communication terminal to a site which provides large-volume content is actually restricted due to a filtering function so that the communication terminal carries out a communication only at a low transmission rate, a port to which the communication terminal is connected operates in an operation mode having the highest transmission rate, or operates in an operation mode having a transmission rate which is sufficient to transmit or receive large-volume content.

In other words, an excess, unused communication band has wastefully been assigned to the communication terminal whose access is restricted due to the filtering function.

In addition, a LAN switch consumes less electric power in the operation mode having a low transmission rate than in the operation mode having a high transmission rate. For example, a LAN switch consumes less electric power in the operation mode having a 10-Mbps full-duplex transmission than in the operation mode having a 100-Mbps full-duplex transmission.

However, even in such a case where the LAN switch can operate in the operation mode having a low transmission rate so that power consumption is reduced, the operation mode of the LAN switch remains unchanged according to the conventional art.

This indicates not only that an excess communication band has been assigned to a communication terminal, but also that electric power has been consumed wastefully.

It is possible to reduce the above wasteful use of a band and electric power by switching operation modes in accordance with traffic on a network. Such an arrangement, however, has a problem that it will require complex mechanisms such as (i) a mechanism for monitoring the traffic on the network, (ii) a mechanism for counting the traffic, (iii) a mechanism for finding a line utilization for each port from a result of the count, and (iv) a mechanism for preferentially changing an operation mode for a port which has the lowest line utilization.

The present invention has been accomplished in view of the above problem. It is an object of the present invention to provide a transmission rate setting device, a transmission rate setting device control method, a content-filtering system, a transmission rate setting device control program, and a computer-readable recording medium, with each of which it is possible to reduce a wasteful consumption of electric power for a data communication without providing a complex mechanism.

Solution to Problem

In order to solve the above problem, a transmission rate setting device of the present invention is a transmission rate setting device for setting a transmission rate for a communication between a communication terminal and a communication destination for the communication terminal, the transmission rate setting device comprising: restriction detecting means for detecting that a restriction is placed on the communication from the communication terminal to the communication destination for the communication terminal; and transmission rate setting means for, in a case where the restriction detecting means has detected that a restriction is placed on the communication, setting a transmission rate for the communication, carried out by the communication terminal, so that the transmission rate becomes lower than before the restriction is placed on the communication.

In order to solve the above problem, a transmission rate setting device control method of the present invention is a control method for controlling a transmission rate setting device for setting a transmission rate for a communication between a communication terminal and a communication destination for the communication terminal, the control method comprising the steps of: (i) detecting that a restriction is placed on the communication from the communication terminal to the communication destination for the communication terminal; and (ii) setting, if a restriction on the communication is detected in the step (i), the transmission rate for the communication, carried out by the communication terminal, so that the transmission rate becomes lower before the restriction is placed on the communication.

According to the above arrangement, if the restriction detecting means has detected that a restriction has been placed on the communication from the communication terminal to the communication destination for the communication terminal, the transmission rate setting means sets the transmission rate for the communication between the communication terminal and the communication destination so that the transmission rate becomes lower than before the detection.

Normally, in a case where a transmission rate is set at a lower level, consumption of electric power necessary to carry out a communication becomes smaller accordingly.

In addition, in a case where the communication from the communication terminal to the communication destination for the communication terminal has been restricted, it is no longer necessary to maintain a high transmission rate for the communication between them.

According to the present invention, in the case where it is no longer necessary, due to a restriction on the communication, to maintain a high transmission rate for the communication between a communication terminal and a communication destination for the communication terminal, it is possible to set the transmission rate at a lower level. This makes it possible to reduce wasteful consumption of electric power for a communication.

The transmission rate setting device is arranged to set a transmission rate at a lower level as described above. This is because it is advantageously easier to recover a transmission function for a subsequent communication in the case where a transmission rate is set at a lower level than in the case where the transmission function is completely stopped. Specifically, in the case where the transmission function is completely stopped, it is necessary to provide means for recovering a transmission function by a method other than a method of adjusting a communication. On the other hand, the above arrangement, in which a transmission rate is set at a lower level, eliminates the need to provide the means.

Advantageous Effects of Invention

The transmission rate setting device of the present invention includes: restriction detecting means for detecting that a restriction is placed on the communication from the communication terminal to the communication destination for the communication terminal; and transmission rate setting means for, in a case where the restriction detecting means has detected that a restriction is placed on the communication, setting a transmission rate for the communication, carried out by the communication terminal, so that the transmission rate becomes lower than before the restriction is placed on the communication.

The transmission rate setting device control method of the present invention includes the steps of: (i) detecting that a restriction is placed on the communication from the communication terminal to the communication destination for the communication terminal; and (ii) setting, if a restriction on the communication is detected in the step (i), the transmission rate for the communication, carried out by the communication terminal, so that the transmission rate becomes lower than before the restriction is placed on the communication.

As such, in the case where it is no longer necessary, due to a restriction on the communication, to maintain a high transmission rate for the communication between a communication terminal and a communication destination for the communication terminal, it is possible to set the transmission rate at a lower level. This makes it possible to reduce wasteful consumption of electric power for a communication.

BRIEF DESCRIPTION OF DRAWINGS

FIG. 3 is a diagram illustrating an example MAC address table.

FIG. 5 is a diagram illustrating an example content filter DB.

FIG. 8 is a diagram illustrating an example data structure for a port restriction period information table.

FIG. 10 is a diagram illustrating an example data structure for a port restriction terminal information table.

FIG. 12 is a diagram illustrating an example data structure for the port restriction terminal information table.

DESCRIPTION OF EMBODIMENTS

An embodiment of the present invention is described below with reference to FIGS. 1 through 14.

Figure 2:
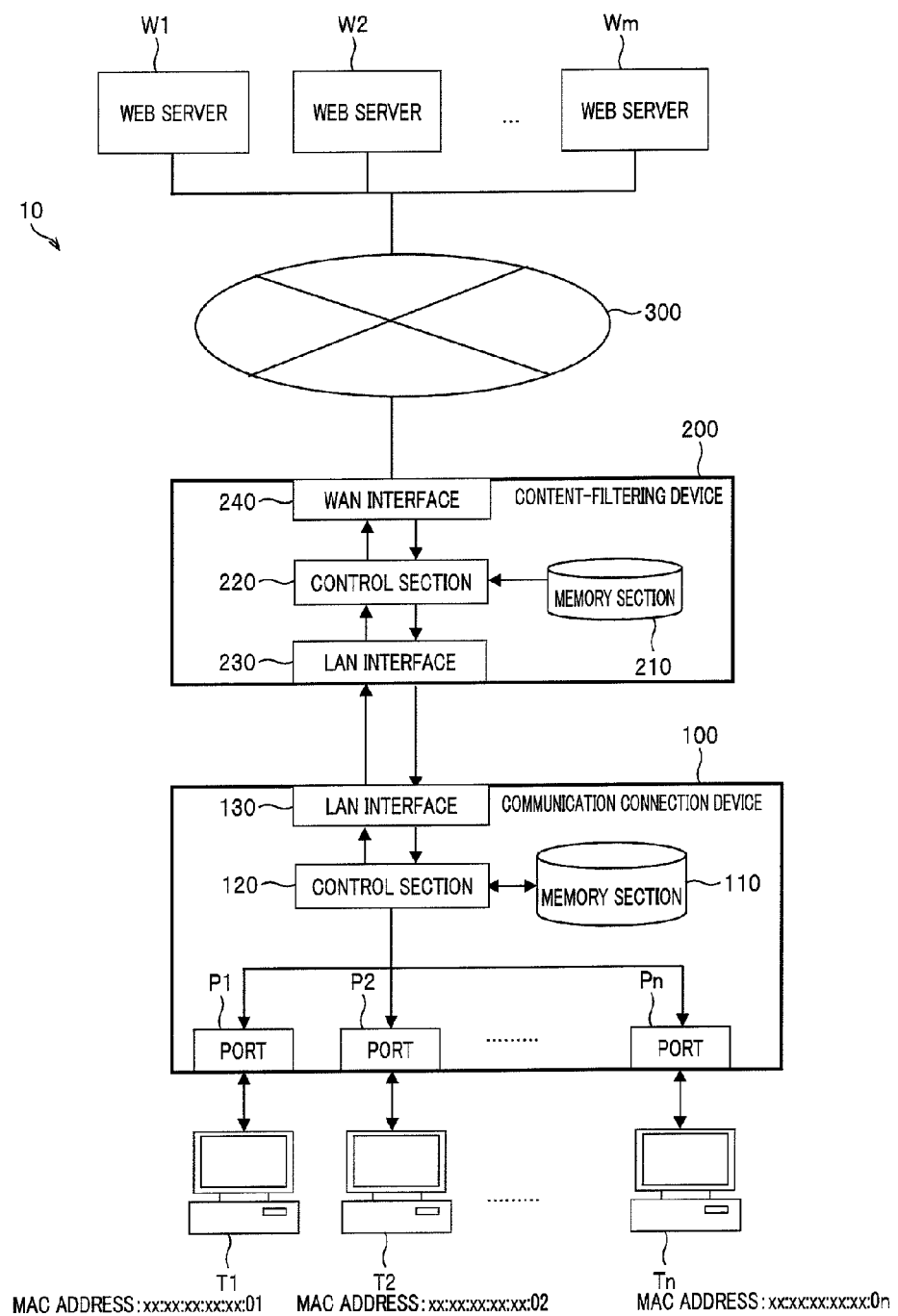
FIG. 2 is a block diagram illustrating an example network configuration of a content-filtering system including as its elements the communication connection device and content-filtering device according to an embodiment of the present invention.

With reference to FIG. 2, the following description deals first with a content-filtering system 10 of the present embodiment and then with a hardware configuration of each of a communication connection device (transmission rate setting device; transmission relay device) 100 and content-filtering device 200 of the present embodiment.

FIG. 2 is a block diagram illustrating an exemplary network configuration of the content-filtering system 10 according to the embodiment of the present invention, which content-filtering system 10 includes the communication connection device 100 and the content-filtering device 200 as its elements. FIG. 2 illustrates the hardware configuration of each of the communication connection device 100 and content-filtering device 200 according to the embodiment of the present invention.

(Content-Filtering System)

As illustrated in FIG. 2, the content-filtering system 10 includes the communication connection device 100 and the content-filtering device 200.

The communication connection device 100 routes, switches, and bridges a communication from any of communication terminals T1 through Tn connected to the communication connection device 100. A network device such as a router and a LAN switch (L2/L3 switch) can, for example, be used as the communication connection device 100.

The content-filtering device 200 serves to restrict an access of the communication terminals T1 through Tn via the communication connection device 100 to web servers W1 through Wm. The content-filtering device 200 restricts the access by, for example, (i) analyzing a request transmitted from each targeted one of the communication terminals T1 through Tn and (ii) restricting a transmission of the request if a result of the analysis indicates that the request is unauthorized to be transmitted to its destination and/or that a type of content being requested is unauthorized.

The communication connection device 100 and the content-filtering device 200 are connected to each other via a LAN network. Note that the communication connection device 100 can include all constituents of the content-filtering device 200. In other words, the communication connection device 100 and the content-filtering device 200 can be combined with each other into a single device.

The content-filtering device 200 is connected to the Internet 300, and can thus communicate with the web servers W1 through Wm via the Internet.

As such, the communication terminals T1 through Tn can access the web servers W1 through Wm via the communication connection device 100, the content-filtering device 200, and the Internet.

The communication terminals T1 through Tn are each a terminal for executing a client program, i.e., a so-called browser program, for accessing the web servers W1 through Wm. The communication terminals T1 through Tn can each obtain desired content by transmitting a request to a corresponding one of the web servers W1 through Wm with use of a function of the browser program.

The communication terminals T1 through Tn can each carry out a network communication with the communication connection device 100 in conformity with an Ethernet (registered trademark) standard. The communication terminals T1 through Tn may be, for example, a desktop or notebook PC (personal computer). Further, each of the communication terminals T1 through Tn has a MAC (media access control) address uniquely assigned thereto as terminal identification information. Assume that the MAC addresses assigned to the respective communication terminals T1 through Tn are "xx:xx:xx:xx:xx:01" through "xx:xx:xx:xx:xx:0n".

The request transmitted by any of the communication terminals T1 through Tn includes (i) information indicative of a transmitter of the request, i.e., one of the communication terminals T1 through Tn, which have transmitted the request and (ii) information indicative of a destination of the request, i.e., a communication destination. The information indicative of a communication destination serving as a destination of the request is, for example, a URI of one of the web servers W1 through Wm.

The web servers W1 through Wm may be a single server or a plurality of servers creating a web site. The web servers W1 through Wm each store various content in the form of files. A web server W (any of the web servers W1 through Wm) receives from a client a request which specifies a URI. Then, the web server W transmits, to the client as a response, content corresponding to the URI specified in the request.

(Hardware Configuration of Communication Connection Device)

The following description deals with the hardware configuration of the communication connection device 100 with reference to FIG. 2. The communication connection device 100 includes: a memory section 110; a control section 120; a LAN interface 130; and ports P1 through Pn.

The memory section 110 stores various data and programs. Examples of the memory section 110 encompass: (i) a non-volatile memory device such as a hard disk, (ii) a rewritable non-volatile memory such as a flash memory, (iii) a ROM (read-only memory), i.e., a read-only semiconductor memory for storing, for example, programs necessary for an operation of the control section 120 and/or fixed data for use in various control, and (iv) a RAM, serving as a so-called working memory, for temporarily storing, for example, data for use in a mathematical operation and a result of the mathematical operation.

The control section 120 carries out an overall control of various functions of the communication connection device 100. The control section 120 carries out its control function by causing a processing device such as a CPU (central processing unit) to execute a control program. The control program can, for example, be (i) stored in a memory element such as a RAM (random access memory) and a flash memory, serving as the memory section 110, or (ii) installed in and loaded from a memory device such as a hard disk, serving as the memory section 110. The control section 120 is described later in further detail.

The LAN interface 130 is a network interface for a connection to a LAN, and serves to carry out a wireless or wired data communication with the content-filtering device 200. The LAN interface 130 can carry out a communication by a wired method such as Ethernet (registered trademark) or a wireless method such as infrared communication, Bluetooth (registered trademark), and a wireless LAN in compliance with IEEE802.11a/b/g/n. Note that in the case where a combination of the communication connection device 100 and the content-filtering device 200 is configured as a single device, the communication connection device 100 and the content-filtering device 200 can be connected internally with, e.g., a bus, instead of employing the above communication method.

The ports P1 through Pn can each employ a network interface at which it is possible to change a transmission rate and transmission mode for a communication with a corresponding one of the communication terminals T1 through Tn by changing settings.

In the present embodiment, the ports P1 through Pn each employ a network interface which serves to carry out a communication with a corresponding one of the communication terminals T1 through Tn in conformity with the Ethernet standard.

Specifically, the communication terminals T1 through Tn are connected to the ports P1 through Pn, respectively, with twisted pair cables which comply with the Ethernet standard. The twisted pair cables used in the present embodiment are each an unshielded twisted pair cable abbreviated to "UTP".

The Ethernet standard defines various transmission rates and transmission modes. The transmission rates are, for example, 10 Mbps (megabits per second), 100 Mbps, 1000 Mbps, and 10 Gbps (gigabits per second). The transmission modes are, for example, a full-duplex transmission and a half-duplex transmission. The network interface employed at each of the ports P1 through Pn covers the above transmission rates and transmission modes.

As such, it is possible to change, at each of the ports P1 through Pn, the transmission rate and transmission mode for a communication with a corresponding one of the communication terminals T1 through Tn by changing settings.

(Hardware Configuration of Content-Filtering Device)

The following description deals with the hardware configuration of the content-filtering device 200 with reference to FIG. 2.

The content-filtering device 200 includes: a memory section 210; a control section 220; a LAN interface 230; and a WAN (wide area network) interface 240.

The memory section 210 stores various data and programs. Examples of the memory section 210 encompass a hard disk, a flash memory, a ROM, and a RAM.

The control section 220 carries out an overall control of the respective components of the content-filtering device 200. This function of the control section 220 may be realized by, for example, causing a CPU to execute a program stored in a memory element such as a RAM and a flash memory.

The LAN interface 230 is a network interface for a connection to a LAN, and serves to carry out a wireless or wired data communication with the communication connection device 100. Various communication methods can be employed as appropriate at the LAN interface 230 as in the LAN interface 130 of the communication connection device 100. In the case where the combination of the communication connection device 100 and the content-filtering device 200 is configured as a single device, the communication connection device 100 and the content-filtering device 200 can be connected internally with, e.g., a bus, instead of employing a network communication method.

The WAN interface 240 is a network interface for a connection to a WAN, and serves to carry out a communication for a connection to the Internet 300. Specifically, the WAN interface 240 is an interface for a connection to a network provided by a service provider for the Internet 300. Examples of the network encompass: an analog telephone line network; an ADSL (asymmetric digital subscriber line) network; a leased line network; a CATV (cable television) network; and a FTTH (fiber to the home) network.

(Detail Arrangement of Communication Connection Device)

Figure 1:
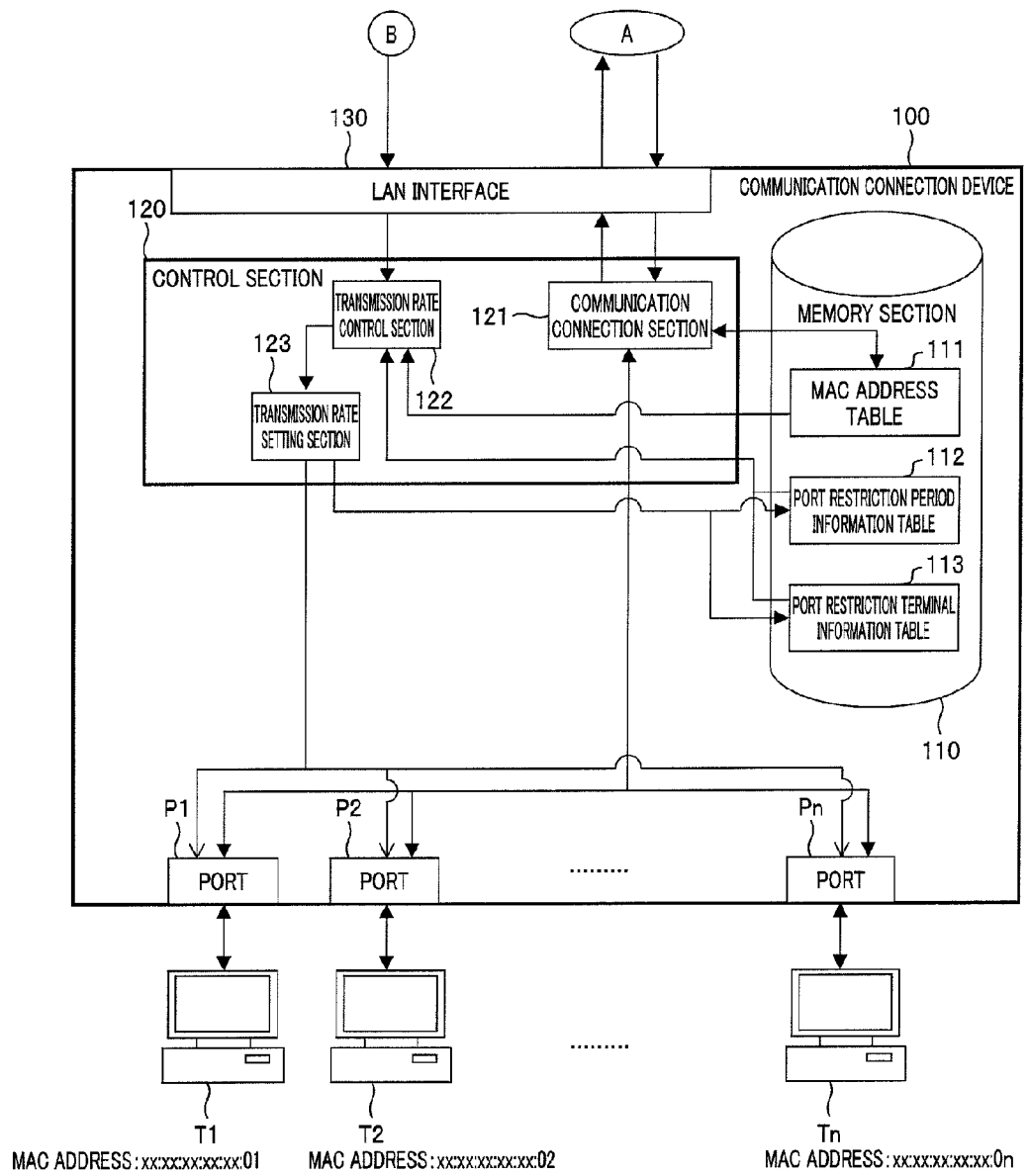
FIG. 1 is a functional block diagram schematically illustrating an arrangement of a communication connection device of the present embodiment.

With reference to FIG. 1, the following description deals in detail with the memory section 110 and control section 120 of the communication connection device 100 of the present embodiment. FIG. 1 is a functional block diagram schematically illustrating an arrangement of the communication connection device 100 of the present embodiment. Note that members having like functions described above with reference to the above drawing are given the like reference numeral, and that a description of such a member is omitted here.

(Detail Arrangement of Memory Section in Communication Connection Device)

The memory section 110 stores: a MAC address table 111; a port restriction period information table 112; and a port restriction terminal information table 113.

The MAC address table 111 is a table in which port identification numbers for identifying the respective ports P1 through Pn are associated with MAC addresses assigned to the respective communication terminals which are connected to the respective ports.

An example of the MAC address table 111 is described below with reference to FIG. 3. FIG. 3 is a diagram illustrating an example of the MAC address table 111.

As illustrated in FIG. 3, the MAC address table 111 is a table in which "PORT IDENTIFICATION NUMBER" is associated with "TERMINAL IDENTIFICATION INFORMATION". The "TERMINAL IDENTIFICATION INFORMATION" stands for the MAC addresses of the respective communication terminals. The numbers "1" through "n" stored under the "PORT IDENTIFICATION NUMBER" are the port identification numbers for identifying the respective ports P1 through Pn.

FIG. 3 shows, for example, that the communication terminal T1, to which the terminal identification information "xx:xx:xx:xx:xx:01" is assigned, is connected to the port P1, whose port identification number is "1".

The port restriction period information table 112 and the port restriction terminal information table 113 each contain information for a criterion for determining whether a transmission rate control section (restriction detecting means; transmission rate setting means; communication identifying means; transmission rate recovering means; non-communicating terminal information obtaining means) 122 will return a port to a before-the-change transmission rate for a port. The port restriction period information table 112 and the port restriction terminal information table 113 are described later in detail.

(Detailed Arrangement of Control Section in Communication Connection Device)

The control section 120 includes: a communication connection section 121; a transmission rate control section 122; and a transmission rate setting section (transmission rate setting means; transmission rate recovering means).

The communication connection section 121 carries out switching for (i) a request transmitted from any of the communication terminals T1 through Tn to a corresponding one of the web servers W1 through Wm and (ii) a response to the request. The communication connection section 121 carries out the switching with reference to, for example, the MAC address table 111 and various routing information.

Through the switching, the communication connection section 121 transmits a request, to be transmitted from any of the communication terminals T1 through Tn to a corresponding one of the web servers W1 through Wm, to the content-filtering device 200 via the LAN interface 130. Further, the communication connection section 121 transmits a response from the corresponding one of the web servers W1 through Wm to a requester out of the communication terminals T1 through Tn.

The transmission rate control section 122 controls a transmission rate for each of the ports P1 through Pn. The transmission rate control section 122 provides a setting instruction to the transmission rate setting section 123 on the basis of rate limit information transmitted from the content-filtering device, the setting instruction instructing the transmission rate setting section 123 to restrict the transmission rate for each of the ports P1 through Pn. The rate limit information includes terminal identification information for a terminal whose transmission rate is to be restricted.

Specifically, the transmission rate control section 122 restricts a transmission rate as follows: The transmission rate control section 122 receives rate limit information transmitted from the content-filtering device. If a communication terminal, to which terminal identification information included in the received rate limit information is assigned, is connected to one of the ports P1 through Pn, the transmission rate control section 122 carries out a control so as to lower a transmission rate for the port. The content of the control is notified to the transmission rate setting section 123 as a setting instruction.

Further, the transmission rate control section 122 provides, under a predetermined condition, a setting instruction to the transmission rate setting section 123 so that the transmission rate setting section 123 returns a restricted port P (restricted one of the ports P1 through Pn) to a before-the-change transmission rate. Determination of the predetermined condition is carried out on the basis of information from the port restriction period information table 112 or the port restriction terminal information table 113.

The transmission rate setting section 123 sets, in response to a setting instruction from the transmission rate control section 122, the transmission rate for a corresponding one of the ports P1 through Pn. The transmission rate setting section 123 can set the transmission rate in conformity with the Ethernet standard. For example, the transmission rate setting section 123, in response to a setting instruction from the transmission rate control section 122 to restrict a transmission rate for a certain port, changes settings for the transmission rate for the certain port from 100 Mbps to 10 Mbps. The settings can be changed reversely from 10 Mbps to 100 Mbps as well.

The transmission rate setting section 123 can also change a transmission mode for a port. For example, the transmission rate setting section 123 can change a transmission mode for any of the ports P1 through Pn from a full-duplex transmission to a half-duplex transmission. Alternatively, the transmission rate setting section 123 can change both the transmission rate and the transmission mode.

For example, the transmission rate setting section 123 can, in response to a setting instruction to restrict a transmission rate for a port, change the transmission rate and transmission mode for the port from a full-duplex transmission at 100 Mbps to a half-duplex transmission at 100 Mbps.

Note that depending on a configuration of the communication connection device 100, electric power consumption may be higher in an operation in the half-duplex transmission mode than in an operation in the full-duplex transmission mode. As such, the transmission rate setting section 123 can be arranged to change the transmission mode only in a case where electric power consumption is lower in the operation in the half-duplex transmission mode than in the operation in the full-duplex transmission mode.

(Detailed Arrangement of Content-Filtering Device)

Figure 4:
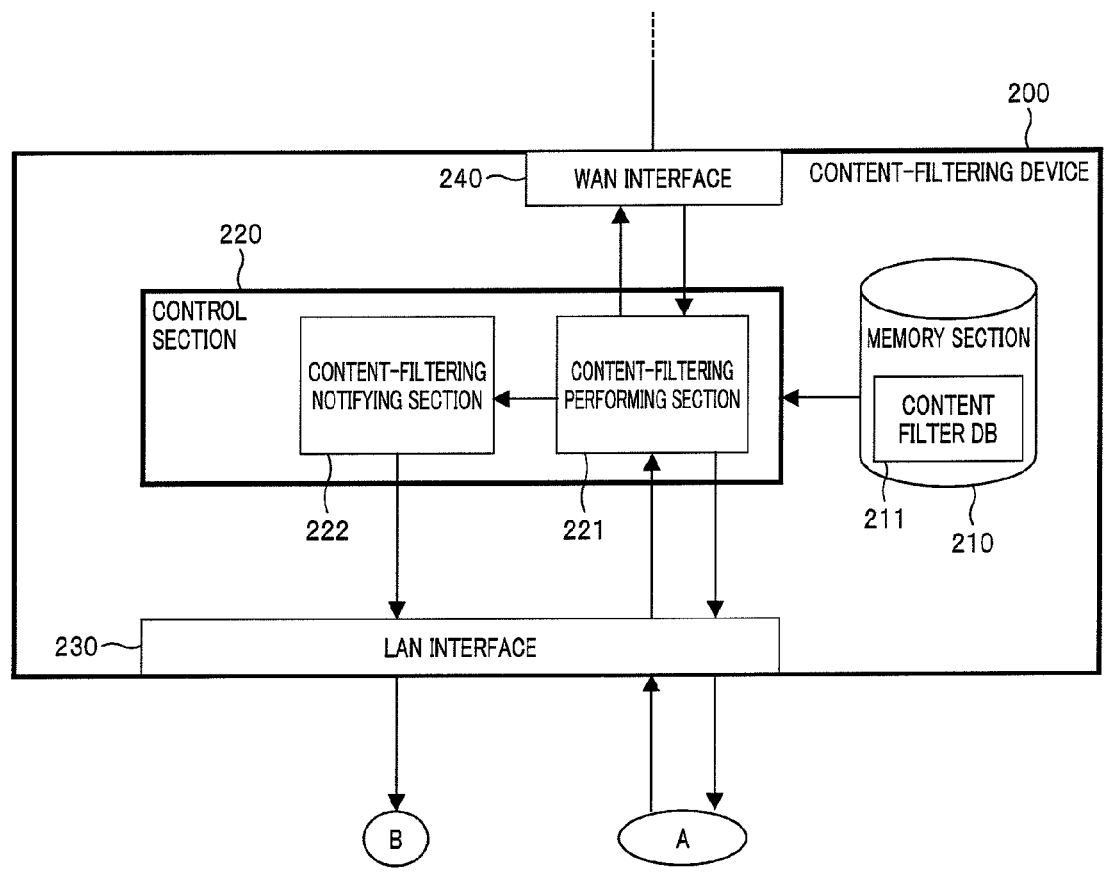
FIG. 4 is a functional block diagram schematically illustrating an arrangement of the content-filtering device of the present embodiment.

With reference to FIG. 4, the following description deals in detail with the memory section 210 and control section 220 of the content-filtering device 200 of the present embodiment. FIG. 4 is a functional block diagram schematically illustrating an arrangement of the content-filtering device 200 of the present embodiment. Note that any member whose function is identical to a function described above with reference to above drawings is assigned the same reference numeral, and that a description of such a member is omitted here.

(Detailed Arrangement of Memory Section in Content-Filtering Device)

The memory section 210 stores a content filter DB (filtering DB; DB stands for "database") 211.

The content filter DB 211 includes restriction information for carrying out a filtering.

An example of the content filter DB 211 is described below with reference to FIG. 5. FIG. 5 is a diagram illustrating an example of the content filter DB 211.

The content filter DB 211 contains restriction information items each including: information under "RESTRICTION TARGET COMMUNICATION DESTINATION INFORMATION"; information under "TERMINAL IDENTIFICATION INFORMATION"; and information under "RATE RESTRICTION INFORMATION".

The content filter DB 211 stores, under the "RESTRICTION TARGET COMMUNICATION DESTINATION INFORMATION", a URI of a web server to which access from a communication terminal is restricted. Settings for this access restriction can be changed as appropriate. It is possible to block the access itself, or to restrict the access so that only access to a particular type of content, e.g., text content, is permitted.

The content filter DB 211 stores, under the "TERMINAL IDENTIFICATION INFORMATION", terminal identification information of a communication terminal whose access is restricted. In the present embodiment, the content filter DB 211 stores the MAC address of a communication terminal under the "TERMINAL IDENTIFICATION INFORMATION". The terminal identification information is, however, not limited to the MAC address, provided that the terminal identification information allows the communication terminal to be identified. Thus, an IP address, for example, can be stored instead.

"ALL" under the "TERMINAL IDENTIFICATION INFORMATION" indicates that all communication terminals are targeted for an access restriction.

The content filter DB 211 stores, under the "RATE RESTRICTION INFORMATION", information indicative of whether, in a case where access to a web server specified in the "RESTRICTION TARGET COMMUNICATION DESTINATION INFORMATION" has been restricted, the communication connection device 100 determines a port, to which the communication terminal accessing the web server is connected, as a "TARGET" or "NON-TARGET" of a transmission rate restriction.

The "RATE RESTRICTION INFORMATION" can be set on the basis of, for example, whether the web server specified in the "RESTRICTION TARGET COMMUNICATION DESTINATION INFORMATION" provides large-volume content. A web server which provides large-volume content is, for example, a web server which provides a service of streaming a moving image.

The "RATE RESTRICTION INFORMATION" is set on the above basis for the following reason: A communication terminal whose access to a web server providing large-volume content is restricted cannot request large-volume content. Thus, there occurs no particular problem even if a transmission rate for the communication terminal is not set at a very high level.

For example, a communication terminal whose access to a web server providing a streaming delivery of a moving image is restricted cannot receive a streaming delivery. Thus, such a communication terminal does not need a high transmission rate necessary to receive a streaming delivery. In other words, a communication terminal under a restriction such as the above simply requires a minimum transmission rate necessary to transmit and receive text data such as email.

The "RATE RESTRICTION INFORMATION" can be set, on the basis of whether the transmission rate for a communication terminal can be restricted without causing a problem, by carrying out a filtering with respect to an access by the communication terminal.

The "RATE RESTRICTION INFORMATION" can also be set on the basis of a volume of traffic between a communication terminal and a web server. For example, the content-filtering device 200 can monitor in advance a volume of traffic between a communication terminal and a web server for a predetermined period of time so that (i) if the volume of traffic between the communication terminal and the web server is equal to or greater than a predetermined volume, the content-filtering device 200 determines that the web server is one that provides a large-volume content and (ii) the "RATE RESTRICTION INFORMATION" of the web server determined as such is automatically set". Alternatively, the "RATE RESTRICTION INFORMATION" can be set manually by a system administrator of the content-filtering system 10.

According to FIG. 5, for example, an access to "xxx.XXX.com" by the communication terminal Tn, to which the terminal identification information "xx:xx:xx:xx:xx:0n" is assigned, is restricted due to a first restriction information item. The "RATE RESTRICTION INFORMATION" of the first restriction information item is set to a "NON-TARGET". This indicates that although the access to "xxx.XXX.com" by the communication terminal T1 is restricted, the transmission rate is not restricted for a port to which the communication terminal Tn is connected. Similarly, an access to "nnn.NNN.jp" by the communication terminal T2, to which the terminal identification information "xx:xx:xx:xx:xx:02" is assigned, is restricted due to a last restriction information item. The transmission rate is, however, not restricted for a port to which the communication terminal T2 is connected.

In addition, an access to "zzz.ZZZ.tv" by the communication terminal T1, to which the terminal identification information "xx:xx:xx:xx:xx:01" is assigned, is restricted due to a third restriction information item. The "RATE RESTRICTION INFORMATION" of the third restriction information item is set to a "TARGET". This indicates that the transmission rate is restricted for a port to which the communication terminal T1 is connected.

(Detailed Arrangement of Control Section in Content-Filtering Device)

The control section 220 includes: a content-filtering performing section (determining means; communication restricting means) 221; and a content-filtering notifying section (restriction notifying means) 222.

The content-filtering performing section 221, with reference to the restriction information stored in the content filter DB 211, carries out a filtering with respect to a request made by each targeted one of the communication terminals T1 through Tn and transmitted via the communication connection device 100. In other words, the content-filtering performing section 221 restricts an access by each targeted one of the communication terminals T1 through Tn to each corresponding one of the web servers W1 through Wm.

The content-filtering performing section 221 compares (i) the communication destination as a request receiver with (ii) the "RESTRICTION TARGET COMMUNICATION DESTINATION INFORMATION" of each restriction information item and further compares (iii) the terminal as a request sender with (iv) the "TERMINAL IDENTIFICATION INFORMATION" of each restriction information item so as to determine identification, i.e., determine whether (i) and (iii) are respectively identical to (ii) and (iv) at any restriction information item. If the identification is obtained, the content-filtering performing section 221 carries out an access restriction. If the identification is not obtained, the content-filtering performing section 221 sends the request to a destination web server via the WAN interface 240. Further, in a case where the content-filtering performing section 221 has carried out an access restriction with reference to a restriction information item, the content-filtering performing section 221 determines whether the "RATE RESTRICTION INFORMATION" of the restriction information item referred to above is set to a "TARGET".

In the case where the content-filtering performing section 221 has carried out an access restriction, if the content-filtering performing section 221 determines that the "RATE RESTRICTION INFORMATION" of the restriction information item referred to for the access restriction is set to a "TARGET", the content-filtering notifying section 222 generates rate limit information and notifies the transmission rate limit information thus generated to the communication connection device 100.

(Flow of Processing of Restricting Transmission Rate)

Figure 6:
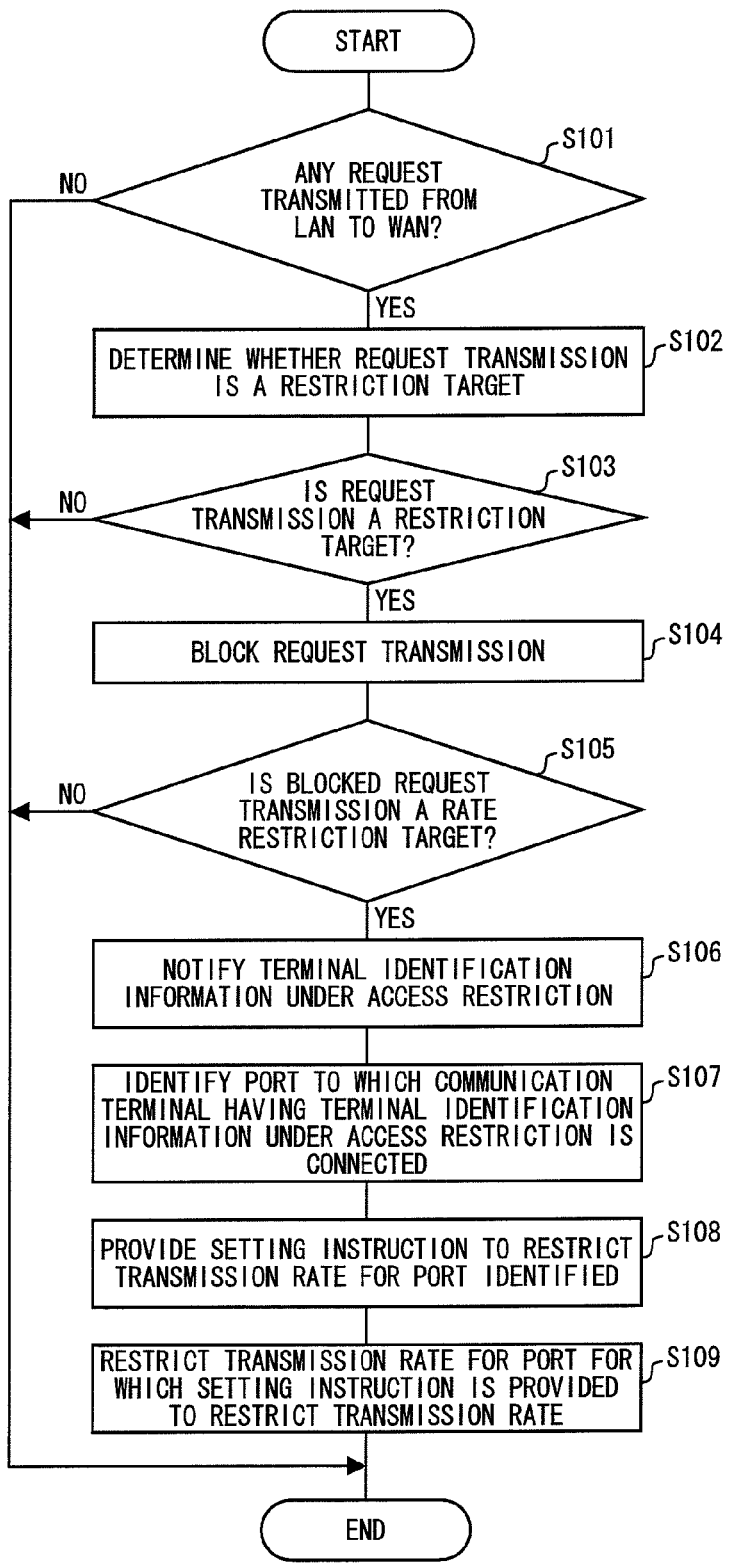
FIG. 6 is a flowchart illustrating a flow of a processing of restricting a transmission rate in the content-filtering system.

With reference to FIG. 6, the following description deals with a flow of a processing carried out by the content-filtering system 10. FIG. 6 is a flowchart illustrating a flow of a processing carried out by the content-filtering system 10 so as to restrict a transmission rate. More specifically, FIG. 6 illustrates a processing which starts when the content-filtering device 200 carries out a content filtering and which ends when the communication connection device 100 carries out a transmission rate restriction for a port.

First, in the content-filtering device 200, if the content-filtering performing section 221 detects an access from the LAN interface 230 to the WAN interface 240, i.e., a request transmission (YES in S101), the content-filtering performing section 221 (i) reads from the request information on a communication destination and on a request sender and then (ii) compares the read information with restriction information stored in the content filter DB so as to determine whether the request transmission is a target of restriction (S102). In other words, the content-filtering performing section 221 determines whether the above access is an access, carried out by a communication terminal whose request transmission is restricted, to a communication destination targeted for this restriction. If the content-filtering performing section 221 determines as a result of the comparison that the request transmission is a target of restriction (YES in S103), the content-filtering performing section 221 blocks the request transmission (S104).

The content-filtering performing section 221 then refers to "RATE RESTRICTION INFORMATION" in a restriction information item, referred to for blocking the access, so as to determine whether the request transmission is a target of restriction of a transmission rate (S105). If the "RATE RESTRICTION INFORMATION" is set to a "NON-TARGET", the content-filtering performing section 221 determines that the request transmission is not a target of restriction of a transmission rate (NO in S105) and ends the processing there.

If, on the other hand, the "RATE RESTRICTION INFORMATION" is set to a "TARGET", the content-filtering performing section 221 determines that the request transmission is a target of restriction of a transmission rate (YES in S105). In response to the determination, the content-filtering notifying section 222 (i) generates rate limit information including terminal identification information of the communication terminal which has carried out the access and (ii) notifies the rate limit information thus generated to the transmission rate control section 122 of the communication connection device 100 (S106).

The transmission rate control section 122 of the communication connection device 100, when notified of the rate limit information by the content-filtering notifying section 222, refers to the MAC address table 111 so as to identify a port to which the communication terminal having the terminal identification information included in the above rate limit information is connected (S107).

The transmission rate control section 122 then provides a setting instruction to the transmission rate setting section 123 so that the transmission rate setting section 123 restricts a transmission rate for the port identified as above (S108). The transmission rate setting section 123 thus restricts the transmission rate for the port for which the transmission rate setting section 123 is instructed, in the setting instruction from the transmission rate control section 122, to restrict the transmission rate (S109). The processing ends there.

(Operational Advantage)

As described above, the communication connection device 100 of the present embodiment, which sets a transmission rate for a communication carried out via a port to which a communication terminal T1 is connected, includes: the transmission rate control section 122 for detecting that a restriction has been placed on a communication from the communication terminal T1 to a web server W1; and the transmission rate setting section 123 for setting, when the transmission rate control section 122 has detected that a restriction has been placed on the communication, the transmission rate for a communication, carried out by the communication terminal T1, so that the transmission rate becomes lower than before the restriction is placed on the communication.

According to the above arrangement, in a case where the restriction on the communication between the communication terminal T1 and the web server W1 has eliminated the need to maintain a high transmission rate, it is possible to set the transmission rate at a lower level. As such, it is possible to reduce wasteful consumption of electric power for a communication.

(Variations)

The following description deals with preferable variations of the communication connection device 100 of the present embodiment. The above description states that in S108, the transmission rate control section 122 instructs the transmission rate setting section 123 to restrict a transmission rate for a port. The present invention is, however, not limited to this. Alternatively, the transmission rate control section 122 can provide a setting instruction to the transmission rate setting section 123 so that the transmission rate setting section 123 disapproves using a port. The transmission rate setting section 123 can, for example, stop a power supply to a target port. In this case, it is possible to further reduce power consumption at the port.

The following case can be assumed, for example: If a particular communication terminal is used to carry out a communication almost exclusively with the web servers W1 through Wm, and an access by the communication terminal is completely restricted by the content-filtering device, it is useless to keep a corresponding port activated. In such a case, it is preferable to stop a power supply to the port so as to disapprove using it. In other words, this arrangement is useful, for example, in a case where a communication terminal which is not permitted to connect to web servers for a security concern is prohibited from a connection, or in a case where an access by a communication terminal is restricted depending on a period of time.

The above description discusses a case where the transmission rate control section 122 instructs the transmission rate setting section 123 to restrict a transmission rate for a port. The present invention is, however, not limited to this. In a case where the communication terminals T1 through Tn each include a mechanism for restricting its own transmission rate, the transmission rate control section 122 can provide a setting instruction directly to a corresponding one of the communication terminals T1 through Tn. In other words, an adjustment can be made such that the transmission rate control section 122 provides a setting instruction to a corresponding one of the communication terminals T1 through Tn for a transmission rate restriction so that the communication terminals T1 through Tn each restrict its own transmission rate for a communication with a corresponding one of the ports P1 through Pn. This arrangement can also be employed for a later-described processing of recovering a transmission rate.

A combination of the transmission rate control section 122 and the transmission rate setting section 123 is not necessarily included in the communication connection device 100, and can thus be a network device independent of the communication connection device 100. The combination can be included in the content-filtering system 10 as, for example, a transmission rate setting device for setting a transmission rate for a communication between a communication terminal and a web server.

(Another Example of Network Configuration of Communication Connection Device)

Figure 7:
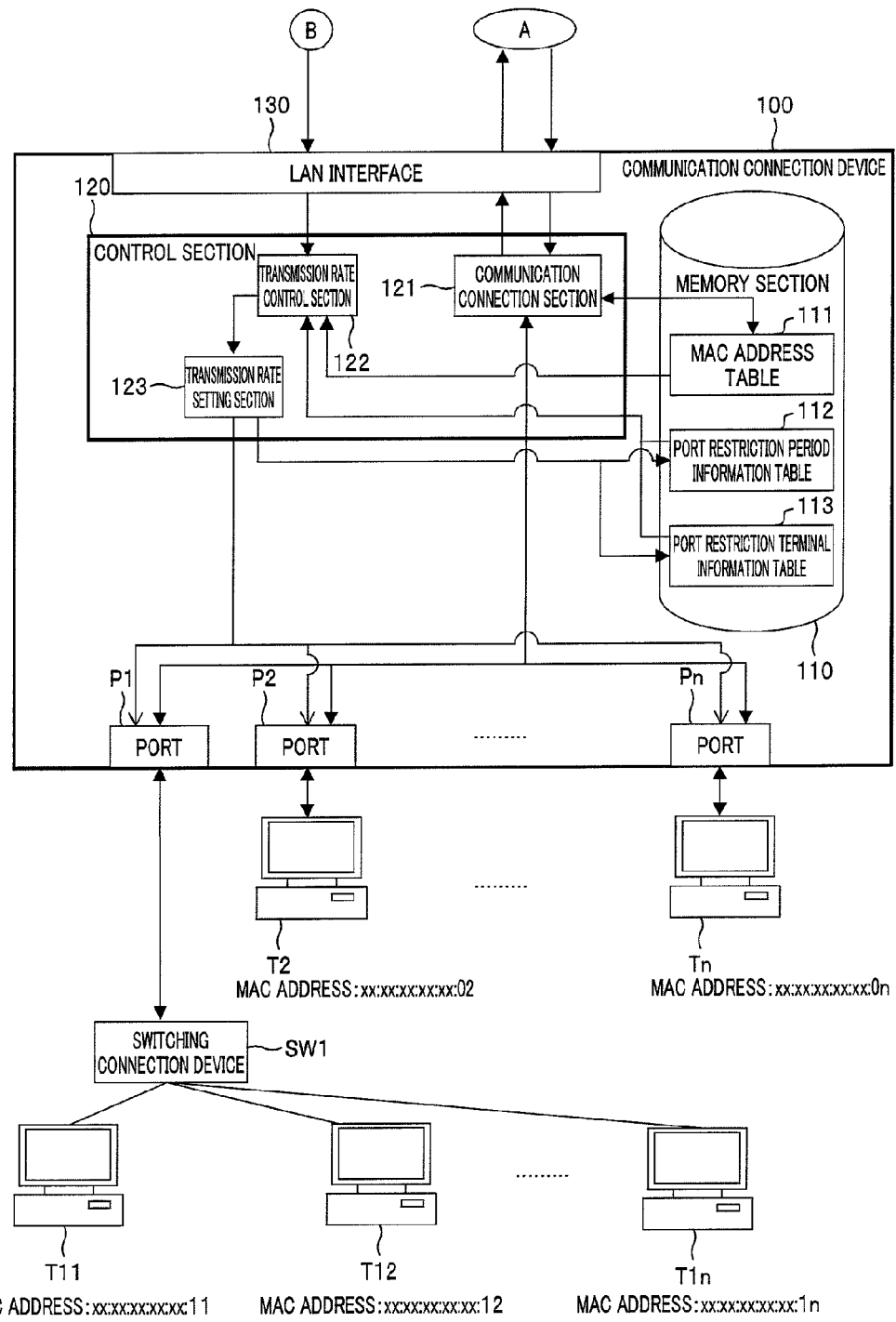
FIG. 7 is a diagram illustrating an example network configuration of the communication connection device.

With reference to FIG. 7, the following description deals with another example of how communication terminals are connected to the communication connection device 100. FIG.

7 is a diagram illustrating an example network configuration of the communication connection device. In FIG. 1, a communication terminal was directly connected to the port P1. In FIG. 7, unlike in FIG. 1, a switching connection device SW1 is connected to the port P1. A network device such as a LAN switch can be used, for example, as the switching connection device SW1. Further, communication terminals T11, T12, ... T1n are connected to the switching connection device SW1. MAC addresses "xx:xx:xx:xx:xx:11", "xx:xx:xx:xx:xx:12", ... "xx:xx:xx:xx:xx:1n" are assigned to the communication terminals T11, T12, ... T1n, respectively.

As described above, according to the example of FIG. 7, the switching connection device SW1 is connected to the port P1, and a network including the switching connection device SW1 and the communication terminals T11, T12, ... T1n is provided under the port P1.

The configuration of FIG. 7 is identical to that of FIG. 1 except for the above point. Thus, any member whose function is identical to a function described above with reference to FIG. 1 is assigned the same reference numeral, and a description of such a member is omitted here.

The following description deals with a case in which in the network configuration illustrated in FIG. 7, a communication terminal included in the network under a port has become a target of a transmission rate restriction, i.e., a restricted terminal.

In this case, the transmission rate control section 122 can determine between S107 and S108 whether there exists any non-restricted communication terminal in the network under the port the network under which includes restricted terminals.

Then, only in a case where there exist only restricted terminals in the network under the port, S108 can be carried out so that the transmission rate control section 122 provides a setting instruction to the transmission rate setting section 123 so that the transmission rate setting section 123 restricts the transmission rate for the identified port.

As a specific example of this, the following description deals with a case in which the communication terminal T11 has become an access restriction target due to an operation of the content-filtering device 200.

In this case, there exists one restricted terminal in the network under the port P1. The other terminals than the communication terminal T11 in the network under the port P1 are non-restricted communication terminals. Thus, the transmission rate control section 122 in this case provides no setting instruction to the transmission rate setting section 123 for restriction of a transmission rate.

As another specific example, the following description deals with a case in which all the communication terminals included in the network under the port P1, namely the communication terminals T11 through T1n, have each become an access restriction target due to the operation of the content-filtering device 200.

In this case, there exist only restricted terminals in the network under the port P1. Thus, S108 is carried out in this case such that the transmission rate control section 122 provides a setting instruction to the transmission rate setting section 123 so that the transmission rate setting section 123 restricts a transmission rate for the identified port.

As described above, the transmission rate control section 122 does not carry out a transmission rate restriction for a port in the case where there coexist a restricted terminal and a non-restricted terminal in a network provided under the port. There is a concern that if the transmission rate for a port is restricted simply because there exists a restricted terminal in a network provided under the port, it will be impossible to secure a transmission rate necessary for a non-restricted terminal in the network to carry out a communication. Such a situation can be avoided by the above arrangement.

(Processing of Recovering Transmission Rate)

The above description deals, with reference to FIG. 6, with the processing of restricting the transmission rate for a port to which a communication terminal whose access is restricted is connected.

The description below deals, with reference to FIGS. 8 through 14, with examples of a processing of recovering the transmission rate for a port which transmission rate has been restricted.

(Example Processing 1)

Figure 9:
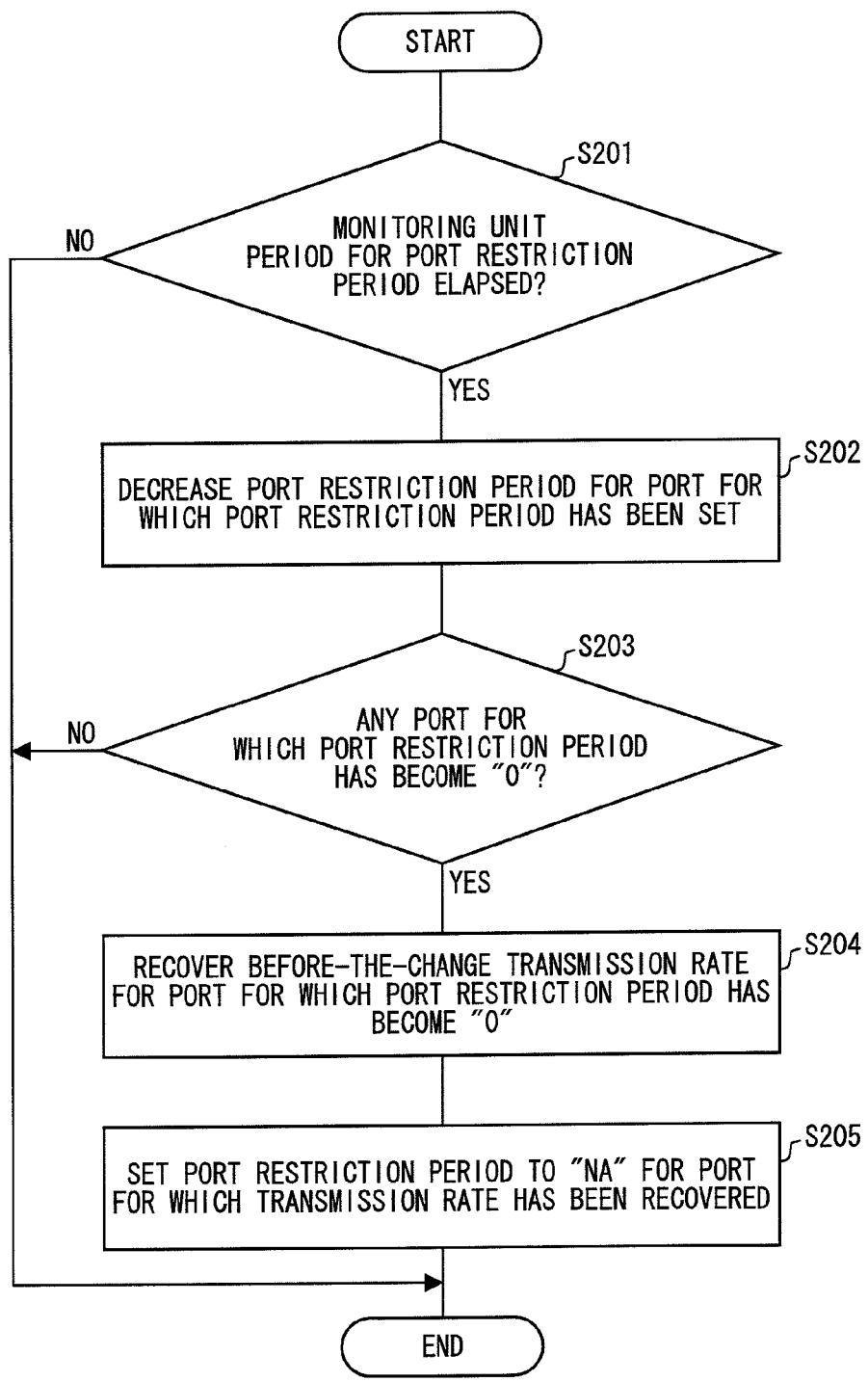
FIG. 9 is a flowchart illustrating an example flow of a processing of recovering a transmission rate for a port.

First, with reference to FIGS. 8 and 9, the following description deals with an example processing of recovering a transmission rate for a port on the basis of a time elapse.

In this example, in a case where the transmission rate for a port is restricted, the transmission rate control section 122 first (i) measures, at predetermined intervals, a period of time during which the transmission rate for the port has been restricted and, after a predetermined period of time has elapsed, (ii) provides a setting instruction to the transmission rate setting section 123 so that the transmission rate setting section 123 recovers a before-the-change transmission rate for the port.

Specifically, the transmission rate control section 122 monitors, with reference to the port restriction period information table 112, a period of time elapsed after the restriction of the transmission rate for the port has started. The description below refers to the above predetermined intervals as "monitoring unit periods". A monitoring unit period can be set to, for example, "1 second".

First, with reference to FIG. 8, the following description deals with information contained in the port restriction period information table 112. FIG. 8 is a diagram illustrating an example data structure of the port restriction period information table 112.

As illustrated in FIG. 8, the port restriction period information table 112 stores "PORT IDENTIFICATION NUMBER" and "PORT RESTRICTION PERIOD" in association with each other.

The "PORT IDENTIFICATION NUMBER" is described above. Its description is thus omitted here.

The "PORT RESTRICTION PERIOD" indicates a period of time during which a transmission rate is to be restricted. The "PORT RESTRICTION PERIOD" is a predetermined period of time set by the transmission rate setting section 123 when the transmission rate for the port is restricted in S109. The predetermined period of time can be set to a period of any length, e.g., "1800 seconds".

The transmission rate control section 122 decreases the "PORT RESTRICTION PERIOD" as time elapses. When the "PORT RESTRICTION PERIOD" becomes "0", the transmission rate control section 122 provides a setting instruction to the transmission rate setting section 123 so that the transmission rate setting section 123 recovers a before-the-change transmission rate for the port.

The "PORT RESTRICTION PERIOD" in the port restriction period information table 112 is set by the transmission rate setting section 123 in S109.

For example, in the network configuration illustrated in FIG. 1, in a case where the communication terminal T1 connected to the port P1 has become a restricted terminal, the transmission rate setting section 123 sets a port restriction period to "1800 seconds" for a port identification number of "1" (see FIG. 8). Note that for a port which is not restricted, a port restriction period is set to "NA", which indicates that the port is not restricted.

With reference to FIG. 9, the following description deals with the processing of recovering a transmission rate for a port on the basis of a time elapse. FIG. 9 is a flowchart illustrating a flow of the processing of recovering a transmission rate for a port on the basis of a time elapse.

It is assumed that in S109, the transmission rate setting section 123 has restricted respective transmission rates for certain ports in response to setting instructions from the transmission rate control section 122.

The transmission rate control section 122 determines whether a monitoring unit period for the port restriction periods has elapsed (S201). When a monitoring unit period has elapsed (YES in S201), the transmission rate control section 122 decreases each of the port restriction periods in the port restriction period information table 112 by an amount equivalent to the monitoring unit period (S202). The transmission rate control section 122 sequentially repeats S201 and S202. If the port restriction period for any given port has become "0" (YES in S203), the transmission rate control section 122 provides a setting instruction to the transmission rate setting section 123 so that the transmission rate setting section 123 returns the given port to a before-the-change transmission rate, for which the port restriction period has become "0" (S204). The transmission rate setting section 123 then sets the port restriction period for the port, for which the before-the-change transmission rate has been recovered, to "NA" (S205). The processing ends there.

(Example Processing 2)

Figure 11:
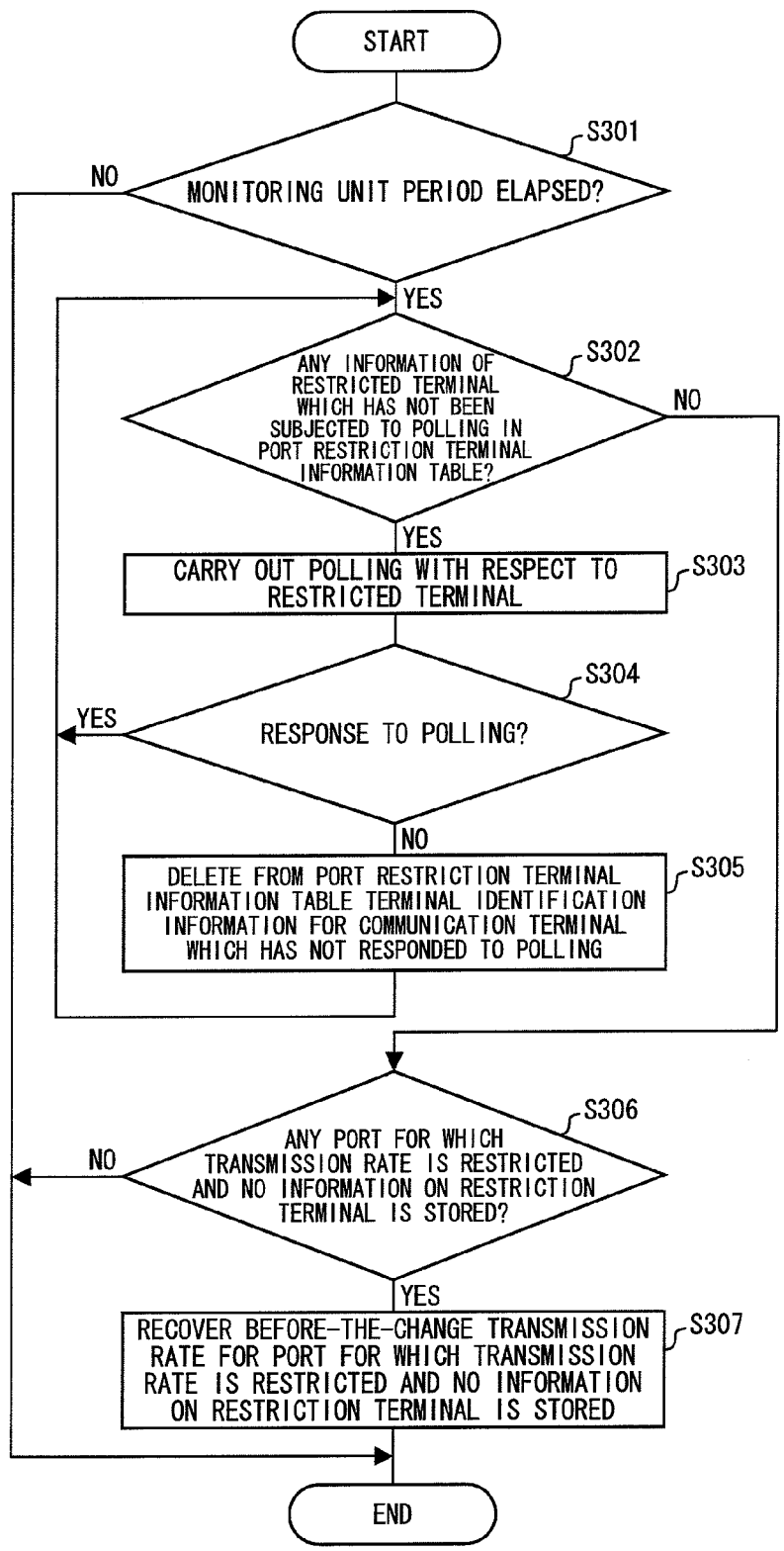
FIG. 11 is a flowchart illustrating another example flow of a processing of recovering a transmission rate for a port.

With reference to FIGS. 10 and 11, the following description deals with an example processing of recovering a transmission rate for a port on the basis of a result of determining by polling whether a restricted terminal is connected to a port.

In this example, in a case where the transmission rate for a port is restricted, the transmission rate control section 122 sequentially carries out a polling, at predetermined intervals, with respect to each communication terminal connected to a port.

The polling can be carried out on the basis of, for example, IP addresses. Specifically, the polling can be carried out by means of an ICMP echo request used in a "ping" command available in a UNIX (registered trademark) OS or a Windows (registered trademark) OS.

Alternatively, it is possible to employ a method in which existence of a terminal is determined on the basis of a MAC address with use of an L2 protocol.

If a result of the polling indicates that no restricted terminal is connected to a port for which a transmission rate is restricted, the transmission rate control section 122 provides a setting instruction to the transmission rate setting section 123 so that the transmission rate setting section 123 recovers a before-the-change transmission rate for the port.

With reference to FIG. 10, the following description deals with information contained in the port restriction terminal information table 113. FIG. 10 is a diagram illustrating an example data structure of the port restriction terminal information table 113.

As illustrated in (a) of FIG. 10, the port restriction terminal information table 113 stores "PORT IDENTIFICATION NUMBER" and "RESTRICTED TERMINAL IDENTIFICATION INFORMATION" in association with each other.

The "PORT IDENTIFICATION NUMBER" is described above. Its description is thus omitted here.

The "RESTRICTED TERMINAL IDENTIFICATION INFORMATION" indicates terminal identification information registered for a restricted terminal connected to a port for which a transmission rate is restricted.

The "PORT IDENTIFICATION NUMBER" and the "RESTRICTED TERMINAL IDENTIFICATION INFORMATION" are registered in the port restriction terminal information table 113 by the transmission rate setting section 123 when the transmission rate for a port is restricted in S109.

In the example of (a) of FIG. 10, terminal identification information set as the "RESTRICTED TERMINAL IDENTIFICATION INFORMATION" is IP addresses assigned to respective communication terminals. The "RESTRICTED TERMINAL IDENTIFICATION INFORMATION" is set to "NA" for a port to which no restricted terminal is connected.

With reference to FIG. 11, the following description deals with the processing of recovering a transmission rate for a port on the basis of a result of determining by polling whether a restricted terminal is connected to a port. FIG. 11 is a flowchart illustrating a flow of the processing of recovering a transmission rate for a port on the basis of a result of conditional determination by polling.

It is assumed that in S109, the transmission rate setting section 123 has restricted respective transmission rates for certain ports in response to setting instructions from the transmission rate control section 122.

When a predetermined period of time has elapsed (YES in S301), the transmission rate control section 122 determines whether there exists any restricted terminal which has not been subjected to polling among the restricted terminals which are registered in the port restriction terminal information table 113 (S302).

If there exists any restricted terminal which has not been subjected to polling among the restricted terminals which are registered in the port restriction terminal information table 113 (YES in S302), the transmission rate control section 122 carries out a polling with respect to such a restricted terminal (S303).

Then, if there is a response from the restricted terminal which has been subjected to the polling (YES in S304), polling is carried out with respect to next other restricted terminals in turn (back to S302). If there is no response from the restricted terminal which has been subjected to the polling, the transmission rate control section 122 (i) determines that the restricted terminal has been removed from its port and (ii) deletes restricted terminal identification information registered for the port in the port restriction terminal information table 113 (S305).

When the polling ends (NO in S302), the transmission rate control section 122 determines whether there exists any port for which restricted terminal information has been deleted from the port restriction terminal information table 113 as a result of the polling (S306). If there exists any port for which restricted terminal information has been deleted (YES in S306), the transmission rate control section 122 provides a setting instruction to the transmission rate setting section 123 so that the transmission rate setting section 123 recovers a before-the-change transmission rate for the port, for which restricted terminal information has been deleted (S307). The processing ends there.

The following description deals in more detail with the flow of the processing with reference to (a) through (c) of FIG. 10. First, (a) of FIG. 10 illustrates an initial state in which there are registered (i) a port identification number "1" and restricted terminal information "192.168.1.A" and (ii) a port identification number "2" and restricted terminal information "192.168.1.B". In other words, the initial state indicates that (i) respective transmission rates for the ports P1 and P2 are restricted and that (ii) a communication terminal to which an IP address "192.168.1.A" is assigned is connected to the port P1, and a communication terminal to which an IP address "192.168.1.B" is assigned is connected to the port P2.

In this state, a first polling is carried out (S302 through S305). If the communication terminal to which the IP address "192.168.1.B" is assigned has been removed from the port P2, the restricted terminal identification information of the restricted terminal which restricted terminal identification information is registered for the port P2 is deleted from the port restriction terminal information table 113. The transmission rate setting section 123 then returns the port P2 to a before-the-change transmission rate in response to a setting instruction from the transmission rate control section 122 (S307). (b) of FIG. 10 illustrates a state of the port restriction terminal information table 113 which state is observed at this stage.

Next, a second polling is carried out (S302 through S305). If the communication terminal to which the IP address "192.168.1.A" is assigned has been removed from the port P1, the restricted terminal identification information of the restricted terminal which is registered for the port P1 is deleted from the port restriction terminal information table 113. The transmission rate setting section 123 then returns the port P1 to a before-the-change transmission rate in response to a setting instruction from the transmission rate control section 122 (S307). (c) of FIG. 10 illustrates a state of the port restriction terminal information table 113 at this stage. (c) of FIG. 10 indicates that in this state, there exists no port for which a transmission rate is restricted.

(Example Processing 3)

Figure 13:
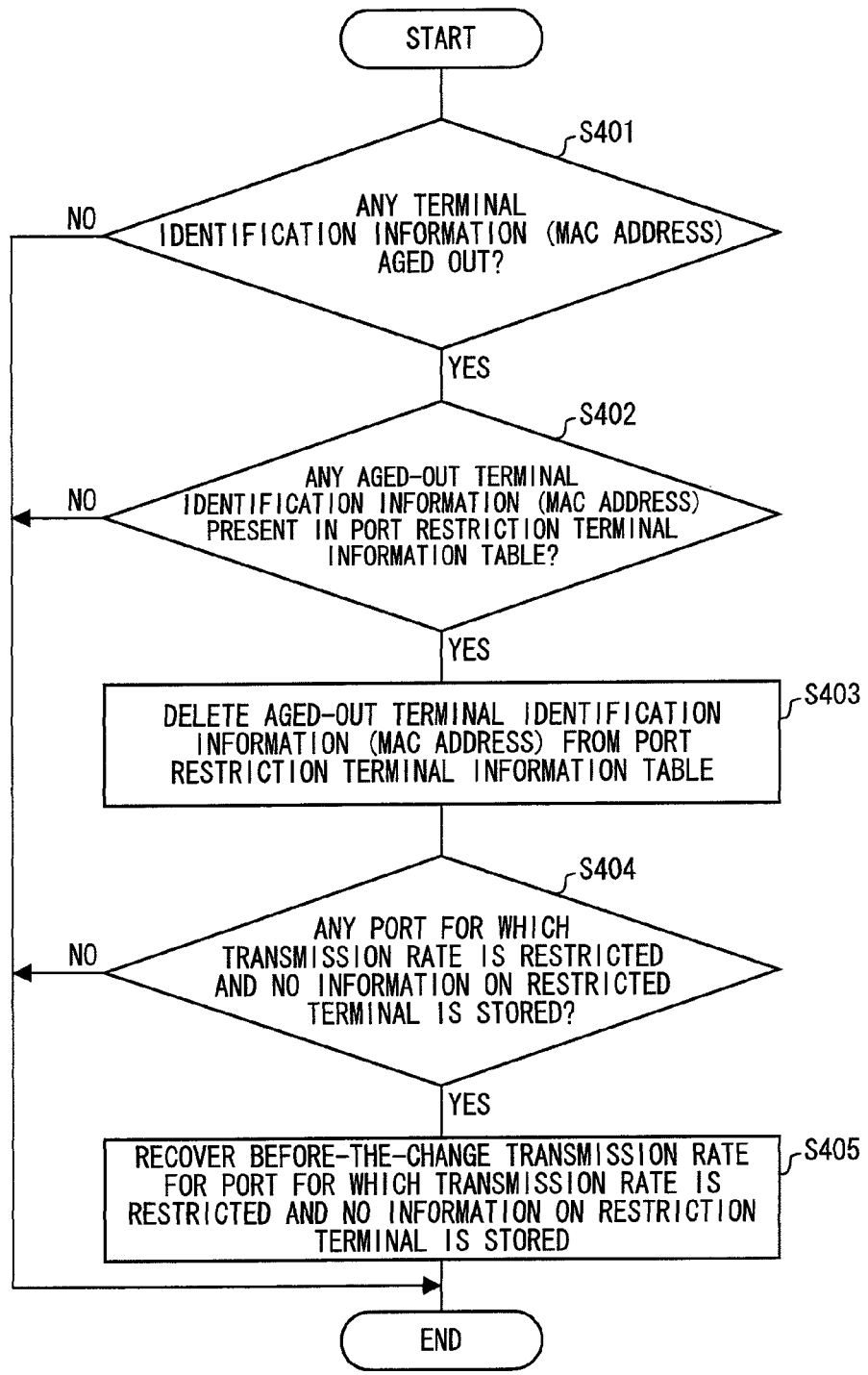
FIG. 13 is a flowchart illustrating another example flow of the processing of recovering a transmission rate for a port.

With reference to FIGS. 12 and 13, the following description deals with an example processing of recovering a transmission rate for a port by detecting that terminal identification information (MAC address) has been aged out from the MAC address table 111.

A normal LAN switch has a function of (i) learning MAC addresses of respective communication terminals connected to the LAN switch and (ii) storing the MAC addresses in a MAC address table 111. A MAC address stored in the MAC address table 111 is deleted from it (referred to as "aged out") if no communication has been carried out for the MAC address for a predetermined period of time (age-out time). In such a case, a corresponding communication terminal is likely to be (i) disconnected from the port or (ii) in a state where a communication cannot be carried out, e.g., in a sleep mode or in a state where a power supply is off.

In this example, in a case where the transmission rate for a port is restricted, the transmission rate control section 122 first detects from the MAC address table 111 that terminal identification information (MAC address) has been aged out. When the aging out is detected for a port for which terminal identification information of a restricted terminal is registered, the transmission rate control section 122 provides a setting instruction to the transmission rate setting section 123 so that the transmission rate setting section 123 returns the port to a default transmission rate.

With reference to FIG. 12, the following description deals with information contained in the port restriction terminal information table 113. FIG. 12 is a diagram illustrating an example data structure of the port restriction terminal information table 113.

As illustrated in (a) of FIG. 12, the port restriction terminal information table 113 stores "PORT IDENTIFICATION NUMBER" and "RESTRICTED TERMINAL IDENTIFICATION INFORMATION" in association with each other. According to the example of (a) of FIG. 12, MAC addresses of respective restricted terminals are registered in the port restriction terminal information table 113 as the "RESTRICTED TERMINAL IDENTIFICATION INFORMATION". This example is identical to that of (a) of FIG. 10, except for the above point.

With reference to FIG. 13, the following description deals with the processing of recovering a transmission rate for a port on the basis of a result of detecting that terminal identification information (MAC address) has been aged out from the MAC address table 111. FIG. 13 is a flowchart illustrating a flow of the processing of recovering a transmission rate for a port on the basis of a result of detecting that terminal identification information (MAC address) has been aged out from the MAC address table 111.

It is assumed that in S109, the transmission rate setting section 123 has restricted respective transmission rates for certain ports in response to setting instructions from the transmission rate control section 122.

The transmission rate control section 122 determines whether any terminal identification information (MAC address) has been aged out from the MAC address table 111 (S401).

If any terminal identification information (MAC address) has been aged out (YES in S401), the transmission rate setting section 123 determines whether the aged-out terminal identification information (MAC address) is present in the port restriction terminal information table 113 (S402).

If the aged-out terminal identification information (MAC address) is present in the port restriction terminal information table 113 (YES in S402), the transmission rate control section 122 deletes the restricted terminal identification information registered in the port restriction terminal information table 113 (S403).

The transmission rate control section 122 then determines whether there exists any port for which restricted terminal information has been deleted from the port restriction terminal information table 113 as a result of detection of aging out (S404). If there exists any port for which restricted terminal information has been deleted (YES in S404), the transmission rate control section 122 provides a setting instruction to the transmission rate setting section 123 so that the transmission rate setting section 123 returns to a before-the-change transmission rate the port for which restricted terminal information has been deleted (S405). The processing ends there.

The following description deals in more detail with the flow of the processing with reference to (a) through (c) of FIG. 12.

(a) of FIG. 12 illustrates an initial state in which there are registered (i) a port identification number "1" and restricted terminal information "xx:xx:xx:xx:xx:01" and (ii) a port identification number "2" and restricted terminal information "xx:xx:xx:xx:xx:02". In other words, the initial state indicates that (i) respective transmission rates for the ports P1 and P2 are restricted and that (ii) a communication terminal T1 to which a MAC address "xx:xx:xx:xx:xx:01" is assigned is connected to the port P1, and a communication terminal T2 to which a MAC address "xx:xx:xx:xx:xx:02" is assigned is connected to the port P2.

It is assumed that the MAC address "xx:xx:xx:xx:xx:02" has been aged out from the MAC address table 111 because the communication terminal T2, to which the MAC address "xx:xx:xx:xx:xx:02" is assigned, carried out no communication via the port P2 for a predetermined period of time (YES in S401; first time).

Since restricted terminal identification information of the communication terminal T2, i.e., a restricted terminal connected to the port P2, is registered in the port restriction terminal information table 113 (YES in S402), the registered restricted terminal identification information of the restricted terminal is deleted from the port restriction terminal information table 113 by the transmission rate control section 122 (S403).

An before-the-change transmission rate for the port P2 is then recovered by the transmission rate setting section 123 in response to a setting instruction from the transmission rate control section 122 (S405). (b) of FIG. 12 illustrates a state of the port restriction terminal information table 113 which state is observed at this stage.

Next, it is further assumed that the MAC address "xx:xx:xx:xx:xx:01" has been aged out from the MAC address table 111 (YES in S401; second time). Restricted terminal identification information of the restricted terminal connected to the port P1 is thus deleted from the port restriction terminal information table 113 (S403). A before-the-change transmission rate for the port P1 is then recovered (S405). (c) of FIG. 12 illustrates a state of the port restriction terminal information table 113 which state is observed at this stage. (c) of FIG. 12 indicates that in this state, there exists no port for which a transmission rate is restricted.

The above description deals with an example of recovering a before-the-change transmission rate on the basis of a result of detecting aging out of a MAC address from the MAC address table. The present invention is, however, not limited to this, provided that it is possible to identify a communication terminal which has not carried out a communication for a predetermined period of time. The present invention makes it possible to restore a before-the-change transmission rate to a port via which such a communication terminal previously carried out a communication.

(Example Processing 4)

Figure 14:
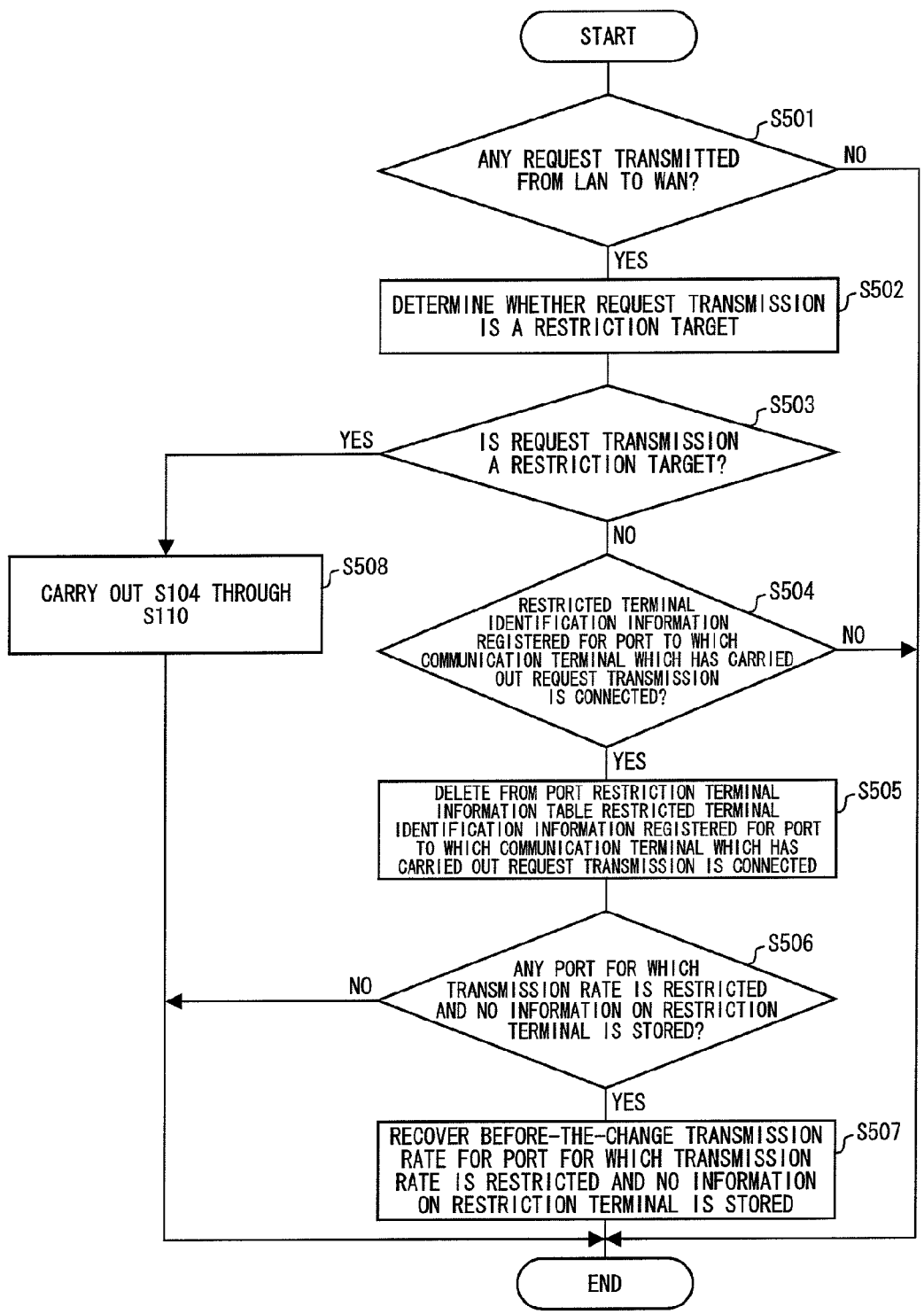
FIG. 14 is a flowchart illustrating still another example flow of the processing of recovering a transmission rate for a port.
Figure 15:
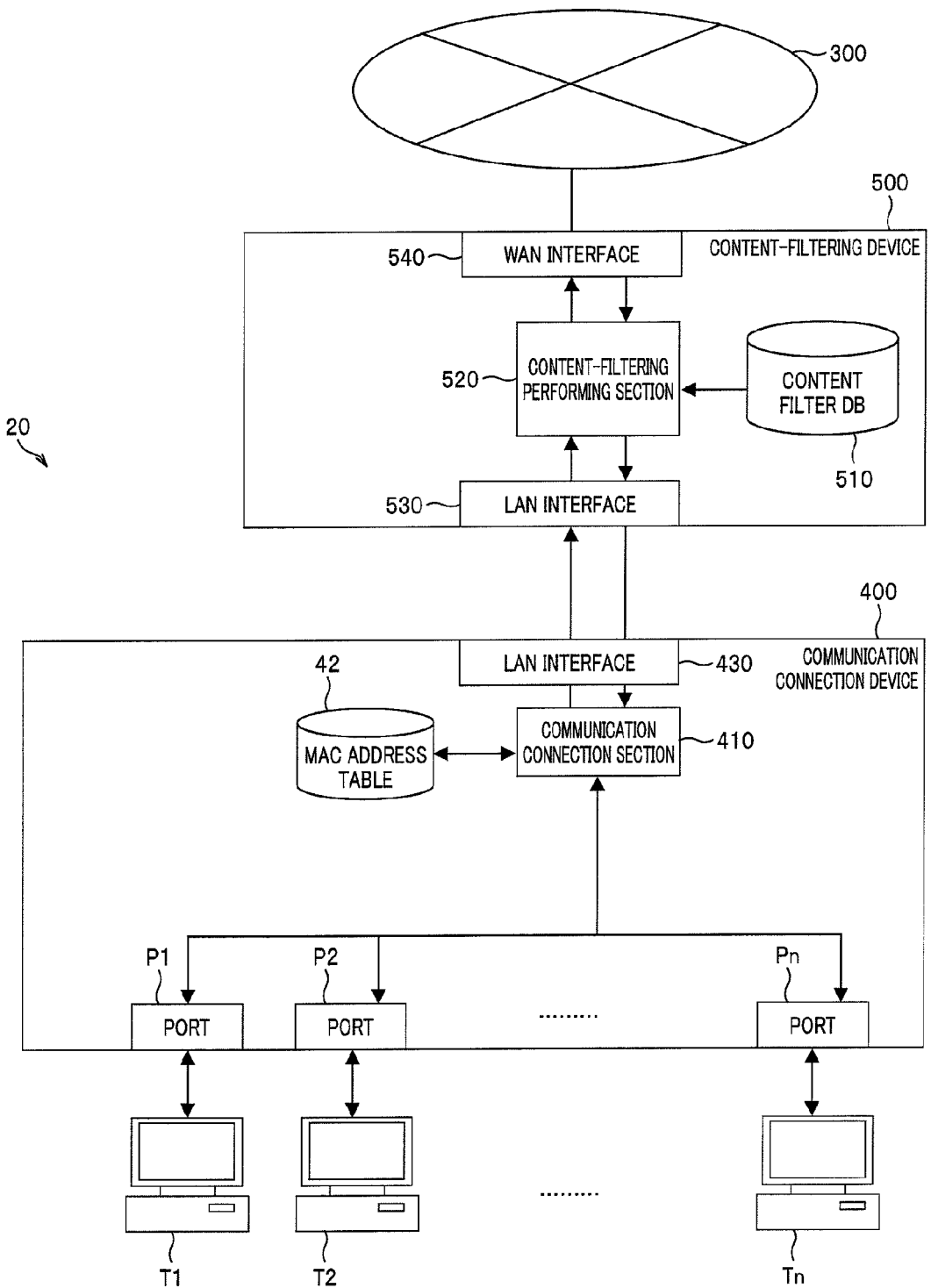
FIG. 15 is a functional block diagram schematically illustrating an arrangement of a conventional content-filtering system.

With reference to FIGS. 12 and 14, the following description deals with an example processing of recovering a transmission rate for a port which processing is carried out in a case where an access is carried out by a non-restricted communication terminal via a port for which a transmission rate is restricted.

In this example, in a case where the transmission rate for a port is restricted, the content-filtering device 200 (i) detects an access from the port for which the transmission rate is restricted and thus (ii) carries out a filtering. If a result of the filtering indicates that the access is not restricted, the content-filtering device 200 notifies this to the transmission rate control section 122.

Upon receipt of the notification, the transmission rate control section 122 provides a setting instruction to the transmission rate setting section 123 so that the transmission rate setting section 123 returns the port to a before-the-change transmission rate.

The above access which is not restricted stands for an access from a communication terminal which is not a target of a filtering by the content-filtering device 200. In other words, the above access stands for a transmission of a request which is not specified in restriction information registered in the content filter DB 211.

With the arrangement of this example, it is possible to recover a before-the-change transmission rate for a port in a case where a communication terminal connected to the port carries out an access, i.e., a request transmission, which is not restricted.

When the transmission rate for a port is restricted in S109, the transmission rate setting section 123 registers restricted terminal identification information of a restricted terminal in the port restriction terminal information table 113. The port restriction terminal information table 113 may be as described above with reference to FIG. 12, and a description of the content is thus omitted here.

With reference to FIG. 14, the following description deals with the processing of recovering a transmission rate for a port which processing is carried out in a case where an access is carried out by a non-restricted communication terminal via a port for which a transmission rate is restricted. FIG. 14 is a flowchart illustrating a flow of the processing of recovering a transmission rate for a port which processing is carried out in a case where an access is carried out by a non-restricted communication terminal via a port for which a transmission rate is restricted.

S501 through S503 are identical to S101 through S103, respectively. A description of S501 through S503 is thus omitted here.

If the request transmission is a restriction target (YES in S503), S104 through S110 are carried out. If, on the other hand, the request transmission is not a restriction target (NO in S503), the content-filtering notifying section 222 of the content-filtering device 200 notifies to the transmission rate control section 122 of the communication connection device 100 that the request transmission is not a restriction target. The notification includes terminal identification information of a communication terminal which has carried out the request transmission which is not a restriction target. The terminal identification information in this example is a MAC address of the communication terminal.

Upon receipt of the notification from the content-filtering notifying section 222, the transmission rate control section 122 determines whether restricted terminal identification information is registered in the port restriction terminal information table 113 for a port to which the communication terminal, which has carried out the request transmission, is connected (S504).

If restricted terminal identification information is not registered in the port restriction terminal information table 113 for the port to which the communication terminal, which has carried out the request transmission, is connected (NO in S504), the processing ends there.

If, on the other hand, restricted terminal identification information is registered in the port restriction terminal information table 113 for the port to which the communication terminal, which has carried out the request transmission, is connected (YES in S504), the transmission rate control section 122 deletes from the port restriction terminal information table 113 the restricted terminal identification information registered for the port to which the communication terminal, which has carried out the request transmission, is connected (S505).

The transmission rate control section 122 then determines whether there exists any port for which restricted terminal information has been deleted from the port restriction terminal information table 113 as a result of detection of a non-restricted request transmission (S506). If there exists any port for which restricted terminal information has been deleted (YES in S506), the transmission rate control section 122 provides a setting instruction to the transmission rate setting section 123 so that the transmission rate setting section 123 restores a before-the-change transmission rate to the port for which restricted terminal information has been deleted (S507). The processing ends there.

(Other Variations)

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

The above description deals with an example in which respective blocks of each of the communication connection device 100 and the content-filtering device 200 are each realized by software with use of a CPU. The respective blocks refer in particular to: the communication connection section 121, transmission rate control section 122, and transmission rate setting section 123 included in the communication connection device 100; and the content-filtering performing section 221 and content-filtering notifying section 222 included in the content-filtering device 200.

The communication connection device 100 and the content-filtering device 200 each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting, to the communication connection device 100 and the content-filtering device 200, a computer-readable storage medium containing control program code (executable program, intermediate code program, or source program) for the communication connection device 100 and the content-filtering device 200, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (registered trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The communication connection device 100 and the content-filtering device 200 may each be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (registered trademark), 802.11 wireless, HDR, mobile telephone network, satellite line, or terrestrial digital network. The present invention encompasses a computer data signal embedded in a carrier wave in which the program code is embodied electronically. The respective blocks of each of the communication connection device 100 and the content-filtering device 200 may be realized by way of hardware.

The present invention can be described as follows: The transmission rate setting device of the present invention is a transmission rate setting device for setting a transmission rate for a communication between a communication terminal and a communication destination for the communication terminal, the transmission rate setting device comprising: restriction detecting means for detecting that a restriction is placed on the communication from the communication terminal to the communication destination for the communication terminal; and transmission rate setting means for, in a case where the restriction detecting means has detected that a restriction is placed on the communication, setting a transmission rate for the communication, carried out by the communication terminal, so that the transmission rate becomes lower than before the restriction is placed on the communication.

The transmission rate setting device of the present invention may preferably be arranged such that the restriction detecting means detects that a restriction is placed on a communication among communications from a plurality of the communication terminals to a plurality of communication destinations for the plurality of the communication terminals, wherein the communication among the communications is referred to as a first communication, the transmission rate setting device further comprises communication identifying means for identifying from among the communication terminals the communication terminal which carries out the first communication detected by the restriction detecting means, and the transmission rate setting means sets a transmission rate for the first communication used by the communication terminal identified by the communication identifying means, so that the transmission rate of the first communication becomes lower than before the restriction is placed on the first communication.

The above arrangement makes it possible to (i) detect that a restriction has been placed on a first one of the communications each carried out between one of the plurality of the communication terminal and a corresponding one of the plurality of the communication destination for the respective plurality of the communication terminal and (ii) identify which of the plurality of the communication terminal carries out the first communication on which the restriction has been placed. The arrangement then sets at a lower level a transmission rate for the first communication carried out by the communication terminal thus identified.

The above arrangement thus makes it possible to lower the transmission rate for the communication carried out by the communication terminal for which it is no longer necessary, due to the restriction on the communication, to maintain a high transmission rate. As such, a communication band is made open by an amount corresponding to an amount by which the transmission rate has been lowered.

This makes it possible to use the communication band, which has thus been made open, for a communication whose transmission rate is not set at a low level. It follows that it is possible to effectively use a communication band which would otherwise remain unused.

The transmission rate setting device of the present invention may preferably be arranged such that the communications are carried out via a communication relay device, the communication relay device has a plurality of ports through which the communications are carried out, a port among the plurality of ports allowing the plurality of the communication terminals to perform the communications via the port; the transmission rate setting means individually sets a transmission rate for each of the plurality of ports included in the transmission relay device; the communication identifying means identifies the first communication on which the restriction is placed, and further identifies via which one of the plurality of ports the first communication is carried out, wherein the port via which the first communication is carried out is referred to as a first port; and in case where the communications carried out by the plurality of the communication terminals are via the first port identified by the communication identifying means, only in the case where the restriction detecting means detects that communications are restricted on all of the plurality of the communication terminals, the transmission rate setting means sets a transmission rate for the first port, so that the transmission rate of the first port becomes lower than before the restriction is placed on the respective communications.

In the case where the plurality of the communication terminal carry out communications via a transmission relay device including a plurality of transmission ports, if a transmission rate for communications carried out via a port is set at a lower level simply because a communication terminal whose communication has been restricted carries out its communication via the port, an unexpected situation may arise in which a communication carried out by a non-restricted communication terminal via the port is also unfortunately affected.

According to the above arrangement, in the case where a plurality of the communication terminal carry out communications via a port identified by the communication identifying means, a transmission rate for the port identified by the communication identifying means is set at a lower level only in the case where the restriction detecting means has detected that a restriction has been placed on all of the communications carried out by the plurality of the communication terminals.

As such, it is possible to (i) prevent a transmission rate from being carelessly set at a low level and thus (ii) prevent impairment of a communication carried out by a communication terminal whose communication has not been restricted.

The transmission rate setting device of the present invention may preferably be arranged such that the transmission rate setting means provides an instruction to the communication terminal, such that the communication terminal lowers the transmission rate for the communication carried out by the communication terminal, so that the transmission rate for the communication becomes lower than before the restriction is placed on the communication.

The above arrangement provides an instruction to a communication terminal, such that the communication terminal sets at a lower level a transmission rate for a communication carried out by the communication terminal, so that the transmission rate for the communication is set at a lower level. This makes it possible to reduce wasteful consumption of electric power for a communication carried out by the communication terminal.

The transmission rate setting device of the present invention may preferably further include non-communicating terminal information obtaining means for identifying a communication terminal whose communication is no longer continued, wherein the communication terminal is referred to as a first communication terminal; and transmission rate recovering means for returning a transmission rate of the first communication terminal identified by the non-communicating terminal information obtaining means, to a transmission rate which the first communication terminal had before the transmission rate was lowered by the transmission rate setting means.

The above arrangement (i) identifies a communication terminal which has not carried out a communication and (ii) recovers a before-the-change transmission rate for the communication, carried out by the communication terminal thus identified, so that the transmission rate becomes a transmission rate which is set before being lowered by the transmission rate setting means.

As such, it is possible to appropriately adjust the transmission rate for a communication between a communication terminal and a communication destination for the communication terminal.

The transmission rate setting device of the present invention may preferably be arranged such that the non-communicating terminal information obtaining means (i) carries out polling with respect to the plurality of the communication terminal so as to detect a communication terminal which does not respond to the polling, wherein the communication terminal which does not respond to the polling is referred to as a second communication terminal, and (ii) identifies the detected second communication terminal as the first communication terminal whose communication is no longer continued.

According to the above arrangement, it is possible to identify by polling a communication terminal, which has not carried out a communication, so that a before-the-change transmission rate is recovered. In the case where there is no response to the polling from a communication terminal, the communication terminal may no longer be connected to the network or be in a state where it does not carry out a communication. In such a case, a before-the-change transmission rate may be recovered.

The transmission rate setting device of the present invention may preferably be arranged such that the non-communicating terminal information obtaining means (i) measures a period of time, for each of the plurality of the communication terminal, during which the communication terminal has no longer continued its communication and (ii) identifies, as the first communication terminal, a communication terminal which has no longer continued its communication for the period of time equal to or longer than a predetermined period of time.

The above arrangement (i) measures, for each of the plurality of the communication terminal, a period of time during which said each of the plurality of the communication terminal has not carried out a communication and (ii) identifies, as the above communication terminal which has not carried out a communication, a communication terminal for which the measured period of time during which a communication has not been carried out is not shorter than a predetermined period of time.

More specifically, it is possible to employ a method in which a before-the-change transmission rate is recovered when MAC address information of a communication terminal has been aged out.

A communication terminal whose MAC address information has been aged out may, for example, not have carried out a communication for an extended period of time or not be connected to a network any longer. In such a case, a before-the-change transmission rate may be recovered.

It is also possible to provide a content-filtering system, including: a transmission rate setting device of the present invention; a content-filtering device including communication restricting means for restricting a communication between a communication terminal and a communication destination for the communication terminal, the content-filtering device including: a filtering DB (database) for storing restriction information in which a communication destination is associated with identification information for a communication terminal whose communication with the communication destination is restricted; determining means for determining, by referring to the restriction information stored in the filtering DB, whether a communication carried out from a communication terminal to a communication destination for the communication terminal corresponds to a communication between a communication terminal and a communication destination associated with each other in the restriction information referred to; communication restricting means for restricting the communication from the communication terminal to the communication destination which communication has been determined by the determining means as corresponding to the communication specified in the restriction information; and restriction notifying means for notifying the identification information of the communication terminal whose communication is restricted by the communication restricting means, in the transmission rate setting device, the restriction detecting means detecting the restriction in response to the notification by the restriction notifying means, and the transmission rate setting means setting a transmission rate for the communication, carried out by the communication terminal identified by the identification information notified by the restriction notifying means, so that the transmission rate becomes lower than before the communication restricting means restricts the communication.

It is also possible to configure a content-filtering system in which (i) the above communication terminal and the content-filtering device for restricting a data communication between a communication terminal and a communication destination are provided and (ii) the content-filtering device notifies identification information of a communication terminal whose communication has been restricted by the transmission rate setting device.

The content-filtering system of the present invention may preferably be arranged such that in the restriction information, the communication destination is associated with rate restriction information indicative of whether the communication is targeted by the transmission rate setting means for lowering the transmission rate; the communication restricting means, while restricting the communication, determines on the basis of the transmission rate restriction information whether the communication is targeted by the communication restricting means for lowering the transmission rate by means of the restriction of the communication; and the restriction notifying means carries out the notification if the communication restricting means has determined that the communication is targeted by the communication restricting means for lowering the transmission rate.

According to the above arrangement, the content-filtering device, while restricting a data communication, notifies to the transmission rate setting device whether the communication is targeted for lowering a transmission rate. This arrangement allows the transmission rate setting device to (i) lower a transmission rate according to need and thus to (ii) control the transmission rate flexibly.

The transmission rate setting device can be realized with use of a computer. In this case, the present invention encompasses (i) a transmission rate setting device control program for realizing the transmission rate setting device by causing a computer to function as each of the means and (ii) a computer-readable recording medium in which the transmission rate setting device control program is stored.

The embodiments and concrete examples of implementation discussed in the foregoing explanation for carrying out the invention serve solely to illustrate the technical details of the present invention, which should not be narrowly interpreted within the limits of such embodiments and concrete examples, but rather may be applied in many variations within the spirit of the present invention, provided that such variations do not exceed the scope of the patent claims set forth below.

INDUSTRIAL APPLICABILITY

The present invention makes it possible to reduce wasteful consumption of electric power for a data communication without providing a complex mechanism. The present invention is thus suitably and widely applicable to a network device.

REFERENCE SIGNS LIST

W1 through Wm web server
SW1 switching connection device
P1 through Pn port
T1 through Tn communication terminal
T11 through Tin communication terminal
10 content-filtering system
100 communication connection device (transmission rate setting device, transmission relay device)
110 memory section
111 MAC address table
112 port restriction period information table
113 port restriction terminal information table
120 control section
121 communication connection section
122 transmission rate control section (restriction detecting means, transmission rate setting means, communication identifying means, transmission rate recovering means, non-communicating terminal information obtaining means)
123 transmission rate setting section (transmission rate setting means, transmission rate recovering means)
130 LAN interface
200 content-filtering device
210 memory section
211 content filter DB (filtering DB)
220 control section
221 content-filtering performing section (determining means, communication restricting means)
222 content-filtering notifying section (restriction notifying means)
230 LAN interface
240 WAN interface
300 Internet

The invention claimed is:

1. A transmission rate setting device for setting a transmission rate for a communication between a communication terminal and a communication destination for the communication terminal, the transmission rate setting device comprising:

a restriction detecting unit configured to detect that a restriction is placed on the communication from the communication terminal to the communication destination for the communication terminal;

a transmission rate setting unit configured to, in a case where the restriction detecting unit has detected that a restriction is placed on the communication, set a transmission rate for the communication, carried out by the communication terminal, so that the transmission rate becomes lower than before the restriction is placed on the communication;

a communication identifying unit configured to identify the communication on which the restriction is placed, wherein the communication between the communication terminal and the communication destination for the communication terminal being carried out via a communication relay device, and the communication relay device having a plurality of ports through which the communication is carried out; and a transmission rate setting unit configured to individually set a transmission rate for each of the plurality of ports included in the transmission relay device, wherein the communication identifying unit is configured to identify the communication on which the restriction is placed and further identify via which one of the plurality of ports the communication is carried out, and in case where the communication carried out by the communication terminal is via the ort identified by the communication identifying unit, the transmission rate setting unit is configured to set a transmission rate for the port, identified by the communication identifying unit, so that the transmission rate of the port becomes lower than before the restriction is placed on the communication.

2. The transmission rate setting device according to claim 1, wherein:

the restriction detecting unit is configured to detect that a restriction is placed on a communication among communications from a plurality of the communication terminals to a plurality of communication destinations for the plurality of the communication terminals, wherein the communication among the communications is referred to as a first communication, the communication identifying unit configured to identify from among the communication terminals the communication terminal which carries out the first communication detected by the restriction detecting unit, and the transmission rate setting unit is configured to set a transmission rate for the first communication used by the communication terminal identified by the communication identifying unit, so that the transmission rate of the first communication becomes lower than before the restriction is placed on the first communication.

3. The transmission rate setting device according to claim 2, wherein:

the communications are carried out via a communication relay device, a port among the plurality of ports allows the plurality of the communication terminals to perform the communications via the port; and in case where the communications carried out by the plurality of the communication terminals are via the port identified by the communication identifying unit, only in the case where the restriction detecting unit is configured to detect that communications are restricted on all of the plurality of the communication terminals, the transmission rate setting unit is configured to set a transmission rate for the port, identified by the communication identifying unit, so that the transmission rate of the port, identified by the communication identifying unit, becomes lower than before the restriction is placed on the respective communications.

4. The transmission rate setting device according to claim 3, further comprising:

a non-communicating terminal information obtaining unit configured to identify a communication terminal whose communication is no longer continued, wherein the communication terminal is referred to as a first communication terminal; and a transmission rate recovering unit configured to return a transmission rate of the first communication terminal identified by the non-communicating terminal information obtaining unit, to a transmission rate which the first communication terminal had before the transmission rate was lowered by the transmission rate setting unit.

5. The transmission rate setting device according to claim 4, wherein the non-communicating terminal information obtaining unit is configured to (i) carry out polling with respect to the plurality of the communication terminal so as to detect a communication terminal which does not respond to the polling, wherein the communication terminal which does not respond to the polling; is referred to as a second communication terminal, and (ii) identify the detected second communication terminal as the first communication terminal whose communication is no longer continued.

6. The transmission rate setting device according to claim 4, wherein the non-communicating terminal information obtaining unit is configured to (i) measure a period of time for each of the plurality of the communication terminal, during which the communication terminal has no longer continued its communication and (ii) identify, as the first communication terminal, a communication terminal which has no longer continued its communication for the period of time equal to or longer than a predetermined period of time.

7. The transmission rate setting device according to claim 1, wherein the transmission rate setting is configured to provide an instruction to the communication terminal, such that the communication terminal lowers the transmission rate for the communication carried out by the communication terminal, so that the transmission rate for the communication becomes lower than before the restriction is placed on the communication.

8. A content-filtering system, comprising:

a transmission rate setting device recited in claim 1;

a content-filtering device including a communication restricting configured to restrict a communication between a communication terminal and a communication destination for the communication terminal, the content-filtering device including:

a filtering DB which is a database configured to store restriction information in which a communication destination is associated with identification information for a communication terminal whose communication with the communication destination is restricted;

a determining unit configured to determine, by referring to the restriction information stored in the filtering DB, whether a communication cat tied out from a communication terminal to a communication destination for the communication terminal corresponds to a communication between a communication terminal and a communication destination associated with each other in the restriction information referred to;

a communication restricting unit configured to restrict means for the communication from the communication terminal to the communication destination which communication has been determined by the determining unit as corresponding to the communication specified in the restriction information; and a restriction notifying unit configured to notify the identification information of the communication terminal whose communication is restricted by the communication restricting unit, in the transmission rate setting device, the restriction detecting unit is configured to detect the restriction in response to the notification by the restriction notifying unit, and the transmission rate setting unit is configured to set a transmission rate for the communication, carried out by the communication terminal identified by the identification information notified by the restriction notifying unit, so that the transmission rate becomes lower than before the communication restricting unit restricts the communication.

9. The content-filtering system according to claim 8, wherein:
in the restriction information, the communication destination is associated with rate restriction information indicative of whether the communication is targeted by the transmission rate setting trait for lowering the transmission rate;
the communication restricting unit, while restricting the communication, configured to determine on the basis of the transmission rate restriction information whether the communication is targeted by the communication restricting unit for lowering the transmission rate by means of the restriction of the communication; and
the restriction notifying unit is configured to carry out the notification based the communication restricting unit has determining that the communication is targeted by the communication restricting unit for lowering the transmission rate.

10. A non-transitory computer-readable recording medium-storing a transmission rate setting device control program for operating a transmission rate setting device, the transmission rate setting device control program causing a computer to execute the steps of:
(i) detecting that a restriction is placed on the communication from the communication terminal to the communication destination for the communication terminal;
(ii) identifying the communication on which the restriction is placed; and
(iii) setting, in response to detecting a restriction on the communication in the step (i), the transmission rate for the communication, carried out by the communication terminal, so that the transmission rate becomes lower than before the restriction is placed on the communication, wherein
the communication between the communication terminal and the communication destination for the communication terminal being carried out via a communication relay device,
the communication relay device having a plurality of ports through which the communication is carried out,
the step (ii) includes identifying the communication on which the restriction is placed and further identifying via which one of the plurality of ports the communication is carried out,
the step (iii) includes individually setting a transmission rate for each of the plurality of ports included in the transmission relay device, and
in case where the communication carried out by the communication terminal is via the port identified by the step (ii), the step (iii) setting a transmission rate for the port, identified in the step (ii), so that the transmission rate of the port, identified in step (ii), becomes lower than before the restriction is placed on the communication.

11. The non-transitory computer-readable recording medium according to claim 10, wherein
the step (i) includes detecting that a restriction is placed on a communication among communications from a plurality of the communication terminals to a plurality of communication destinations for the plurality of the communication terminals, wherein the communication among the communications is referred to as a first communication,
the step (ii) includes identifying from among the communication terminals the communication terminal which carries out the first communication detected in the step (i), and the step (iii) includes setting a transmission rate for the first communication used by the communication terminal identified in the step (ii), so that the transmission rate of the first communication becomes lower than before the restriction is placed on the first communication.

12. The non-transitory computer-readable recording medium according to claim 11, wherein
the communications are carried out via a communication relay device,
a port among the plurality of ports allows the plurality of the communication terminals to perform the communications via the port, and
in case where the communications carried out by the plurality of the communication terminals are via the port identified in the step (ii), only in the case where the step (i) detects that communications are restricted on all of the plurality of the communication terminals, the step (iii) sets a transmission rate for the port, identified in the step (ii), so that the transmission rate of the port, identified in the step (ii), becomes lower than before the restriction is placed on the respective communications.

13. A control method for controlling a transmission rate setting device for setting a transmission rate for a communication between a communication terminal and a communication destination for the communication terminal, the control method comprising:
(i) detecting that a restriction is placed on the communication from the communication terminal to the communication destination for the communication terminal; and
(ii) identifying the communication on which the restriction is placed; and
(iii) setting, in response to detecting a restriction on the communication in the step (i), the transmission rate for the communication, carried out by the communication terminal, so that the transmission rate becomes lower than before the restriction is placed on the communication, wherein
the communication between the communication terminal and the communication destination for the communication terminal being carried out via a communication relay device,
the communication relay device having a plurality of ports through which the communication is carried out,
the step (ii) includes identifying the communication which the restriction is placed and further identifying via which one of the plurality of ports the communication is carried out,
the step (iii) includes individually setting a transmission rate for each of the plurality of ports included in the transmission relay device, and
in case where the communication carried out by the communication terminal is via the port identified by the step (ii), the step (iii) setting a transmission rate for the port, identified in the step (ii), so that the transmission rate of the port, identified in step (ii), becomes lower than before the restriction is placed on the communication.

14. The control method according to claim 13, further comprising:
the step (i) includes detecting that a restriction is placed on a communication among communications from a plurality of the communication terminals to a plurality of communication destinations for the plurality of the communication terminals, wherein the communication among the communications is referred to as a first communication, the step (ii) includes identifying from among the communication terminals the communication terminal which carries out the first communication detected in the step (i), and the step (iii) includes setting a transmission rate for the first communication used by the communication terminal identified in the step (ii), so that the transmission rate of the first communication becomes lower than before the restriction is placed on the first communication.

15. The control method according to claim 14, wherein the communications are carried out via a communication relay device, a port among the plurality of ports allows the plurality of the communication terminals to perform the communications via the port, and in case where the communications carried out by the plurality of the communication terminals are via the port identified in the step (ii), only in the case where the step (i) detects that communications are restricted on all of the plurality of the communication terminals, the step (iii) sets a transmission rate for the port, identified in the step (ii), so that the transmission rate of the port, identified in the step (ii), becomes lower than before the restriction is placed on the respective communications.

* * * * *